United States Patent
Ryu et al.

(10) Patent No.: US 11,072,691 B2
(45) Date of Patent: Jul. 27, 2021

(54) METHOD FOR PRODUCING POROUS GEL-CONTAINING LIQUID, POROUS GEL-CONTAINING LIQUID, METHOD FOR PRODUCING HIGH-VOID LAYER, METHOD FOR PRODUCING HIGH-VOID POROUS BODY, AND METHOD FOR PRODUCING LAMINATED FILM ROLL

(71) Applicant: Nitto Denko Corporation, Ibaraki (JP)

(72) Inventors: Seong Jin Ryu, Ibaraki (JP); Hiromoto Haruta, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 257 days.

(21) Appl. No.: 15/764,653

(22) PCT Filed: Sep. 27, 2016

(86) PCT No.: PCT/JP2016/078397
§ 371 (c)(1),
(2) Date: Mar. 29, 2018

(87) PCT Pub. No.: WO2017/057331
PCT Pub. Date: Apr. 6, 2017

(65) Prior Publication Data
US 2019/0040223 A1 Feb. 7, 2019

(30) Foreign Application Priority Data
Sep. 29, 2015 (JP) .............................. JP2015-192323

(51) Int. Cl.
*C08J 7/043* (2020.01)
*C08J 3/12* (2006.01)
(Continued)

(52) U.S. Cl.
CPC ............... *C08J 7/043* (2020.01); *C08J 3/075* (2013.01); *C08J 3/12* (2013.01); *C08J 5/18* (2013.01);
(Continued)

(58) Field of Classification Search
CPC . C08J 3/075; C08J 2205/02; C08J 9/00; C08J 3/12; C08J 3/02; C08J 9/38;
(Continued)

(56) References Cited

U.S. PATENT DOCUMENTS 2,766,940 A * 10/1956 Weston .................. B02C 25/00
241/21
6,380,265 B1 * 4/2002 Pryor .................... C01B 33/141
516/85

(Continued)

FOREIGN PATENT DOCUMENTS

| CN | 101042438 A | 9/2007 |
| CN | 101052524 A | 10/2007 |

(Continued)

OTHER PUBLICATIONS

International Search Report dated Dec. 27, 2016, issued in counterpart application No. PCT/JP2016/078397. (2 pages).

(Continued)

*Primary Examiner* — Leith S Shafi
*Assistant Examiner* — Inja Song
(74) *Attorney, Agent, or Firm* — Westerman, Hattori, Daniels & Adrian, LLP

(57) ABSTRACT

The present invention aims to provide a method for producing a porous gel-containing liquid that is inexpensive and excellent in homogeneity. The porous gel-containing liquid production method according to the present invention is a method including: a pulverization step of pulverizing a gel of a porous body, wherein the pulverization step is carried (Continued)

out as multi-stage pulverization including a plurality of pulverization stages.

20 Claims, 7 Drawing Sheets

(51) Int. Cl.
  *C08J 9/28* (2006.01)
  *C08J 7/04* (2020.01)
  *C08J 7/046* (2020.01)
  *C08J 3/075* (2006.01)
  *C08J 5/18* (2006.01)
  *C08J 9/38* (2006.01)

(52) U.S. Cl.
  CPC .............. *C08J 7/046* (2020.01); *C08J 7/0427* (2020.01); *C08J 9/28* (2013.01); *C08J 9/38* (2013.01); *C08J 2201/026* (2013.01); *C08J 2201/05* (2013.01); *C08J 2205/02* (2013.01); *C08J 2207/02* (2013.01); *C08J 2367/02* (2013.01); *C08J 2383/04* (2013.01); *C08J 2483/04* (2013.01)

(58) Field of Classification Search
  CPC ..... C08J 7/0427; C08J 9/28; C08J 5/18; C08J 2201/05; C08J 2207/02; C08J 2201/026; C08J 2367/02; C08J 2383/04; C08J 2483/04; C08J 7/04; B05D 7/24
  See application file for complete search history.

(56) References Cited

U.S. PATENT DOCUMENTS

| | | | |
|---|---|---|---|
| 2001/0003358 A1* | 6/2001 | Terase | C01B 33/12 252/62 |
| 2003/0181566 A1 | 9/2003 | Chapman et al. | |
| 2003/0191226 A1 | 10/2003 | Chapman et al. | |
| 2008/0083499 A1 | 4/2008 | Nodono | |
| 2008/0290472 A1 | 11/2008 | Yagihashi et al. | |
| 2008/0311398 A1* | 12/2008 | Bauer | A61K 8/25 428/402 |
| 2009/0011319 A1* | 1/2009 | Joboji | H01M 4/926 429/430 |
| 2012/0015229 A1 | 1/2012 | Ohashi et al. | |
| 2012/0056137 A1* | 3/2012 | Yoon | C01G 23/047 252/519.3 |
| 2012/0142845 A1* | 6/2012 | De Winter | C09C 1/3684 524/525 |
| 2013/0189521 A1* | 7/2013 | Fukuju | C01B 33/16 428/402 |
| 2013/0235309 A1* | 9/2013 | Kogure | B29D 7/01 349/96 |
| 2017/0036191 A1* | 2/2017 | Yang | B01J 20/3042 |
| 2018/0244853 A1* | 8/2018 | Izumi | C08K 5/5415 |

FOREIGN PATENT DOCUMENTS

| | | |
|---|---|---|
| CN | 101679657 A | 3/2010 |
| CN | 103819814 A | 5/2014 |
| EP | 0 415 469 A2 | 3/1991 |
| EP | 0 415 469 A3 | 9/1991 |
| EP | 1106574 A1 | 6/2001 |
| EP | 3246355 A1 | 11/2017 |
| JP | 3-149286 A | 6/1991 |
| JP | 2001-163613 A | 6/2001 |
| JP | 2002-520424 A | 7/2002 |
| JP | 2006-11175 A | 1/2006 |
| JP | 2006-265091 A | 10/2006 |
| JP | 2007-326297 A | 12/2007 |
| JP | 2010-521399 A | 6/2010 |
| JP | 2014-15380 A | 1/2014 |
| TW | 467832 B | 12/2001 |
| WO | 00/002734 A1 | 1/2000 |
| WO | 2008/115812 A2 | 9/2008 |

OTHER PUBLICATIONS

Yildirim, A., et al., "Template free preparation of nanoporous organically modified silica thin films on flexible substrates", Journal of Materials Chemistry, Jan. 31, 2001, vol. 21, No. 38, pp. 14830-14837, XP055370551; cited in EESR.

Extended (supplementary) European Search Report dated Apr. 25, 2019, issued in counterpart EP Application No. 16851502.1. (12 pages).

Office Action dated Aug. 29, 2019, issued in counterpart JP Application No. 2015-192323, with English translation (7 pages).

Office Action dated Apr. 21, 2020, issued in counterpart JP application No. 2015-192323, with English translation. (8 pages).

Office Action dated Apr. 28, 2020, issued in counterpart CN Application No. 201680056435.5, with English Translation. (12 pages).

Office Action dated Feb. 10, 2020, issued in counterpart TW Application No. 105131275, with English Translation. (13 pages).

Office Action dated Feb. 25, 2020, issued in counterpart EP Application No. 16851502.1. (4 pages).

Office Action dated Dec. 4, 2020, issued in counterpart EP Application No. 16851502.1. (5 pages).

* cited by examiner

METHOD FOR PRODUCING POROUS GEL-CONTAINING LIQUID, POROUS GEL-CONTAINING LIQUID, METHOD FOR PRODUCING HIGH-VOID LAYER, METHOD FOR PRODUCING HIGH-VOID POROUS BODY, AND METHOD FOR PRODUCING LAMINATED FILM ROLL

TECHNICAL FIELD

The present invention relates to a method for producing a porous gel-containing liquid, a porous gel-containing liquid, a method for producing a high-void layer, a method for producing a high-void porous body, and a method for producing a laminated film roll.

BACKGROUND ART

Heretofore, various studies have been made on a porous gel-containing liquid that uses, as a raw material, a porous body such as a silica compound material (silicon compound material) and can form a structure with void spaces (also referred to as "void structure" hereinafter). One example of the method for producing the porous gel-containing liquid includes, for example, causing gelation of a porous body such as a silica compound (gelation step) and pulverizing the gelled porous body (porous gel) (pulverization step). By coating the thus-produced porous gel-containing liquid, a void structure is formed. The void structure is applicable to various objects in the form of a layer with void spaces (also referred to as "void layer" hereinafter), for example. Specifically, the void structure is applicable to optical elements etc.

As an example of a conventional pulverization step, Patent Document 1 discloses pulverizing a porous gel in a one-stage pulverization process using an ultrasonic treatment.

CITATION LIST

Patent Document(s)

Patent Document 1: JP 2006-11175 A

BRIEF SUMMARY OF THE INVENTION

Problem to be Solved by the Invention

The porous body that has turned into a gel (porous gel) in the gelation step is in the form of a gel mass, for example. Thus, by performing the pulverization step as disclosed in Patent Document 1, for example, the pulverized porous gel (pulverized products) can be mixed in a liquid easily in a mixing step. This allows a porous gel-containing liquid to be produced easily.

On the other hand, in recent years, there are demands for a porous gel-containing liquid with excellent homogeneity.

With the foregoing in mind, it is an object of the present invention to provide a method for producing a porous gel-containing liquid that is inexpensive and excellent in homogeneity, a porous gel-containing liquid, a method for producing a high-void layer, a method for producing a high-void porous body, and a method for producing a laminated film roll.

Means for Solving Problem

In order to achieve the above object, the present invention provides a method for producing a porous gel-containing liquid, including: a pulverization step of pulverizing a gel of a porous body, wherein the pulverization step is carried out as multi-stage pulverization including a plurality of pulverization stages.

The present invention also provides a porous gel-containing liquid obtained by the porous gel-containing liquid production method according to the present invention.

The present invention also provides a method for producing a high-void layer having a void fraction of at least 60 vol %, including the steps of: producing a porous gel-containing liquid by the porous gel-containing liquid production method according to the present invention; forming a coating film by coating the porous gel-containing liquid onto a base; and drying the coating film.

The present invention also provides a method for producing a high-void porous body having a void fraction of at least 60 vol %, including the steps of producing a porous gel-containing liquid by the porous gel-containing liquid production method according to the present invention; and drying the porous gel-containing liquid.

The present invention also provides a method for producing a laminated film roll including a resin film and a high-void porous layer having a void fraction of at least 60 vol % and formed on the resin film, including the steps of producing a porous gel-containing liquid by the porous gel-containing liquid production method according to the present invention; feeding a resin film unwound from a roll of the resin film; coating the porous gel-containing liquid onto the fed resin film to form a coating film on the resin film; drying the coating film; and winding up a laminated film including the resin film and the high-void layer formed on the resin film after the drying step.

Effects of the Invention

The present invention can provide a method for producing, at an industrial level, a porous gel-containing liquid that is inexpensive and excellent in homogeneity, with which a high-void structure can be formed, a porous gel-containing liquid, a method for producing a high-void layer, and a method for producing a high-void porous body.

MODE FOR CARRYING OUT THE INVENTION

Figure 1:
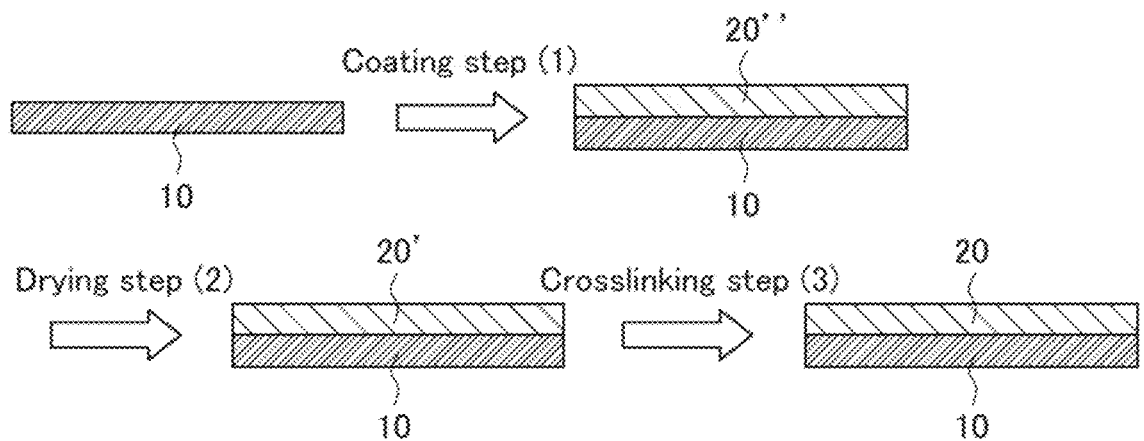
FIG. 1 is a sectional view schematically illustrating an example of a process of a method for forming a functional porous body 20 on a base 10 using the porous gel-containing liquid of the present invention.

The present invention will be described more specifically below with reference to illustrative examples. It is to be noted, however, that the present invention is by no means limited by the following descriptions.

As described above, in the porous gel-containing liquid production method of the present invention, a pulverization step of pulverizing the gel of the porous body includes a plurality of pulverization stages. The number of the pulverization stages is not particularly limited, and may be two or more stages or three or more stages, for example.

In the present invention, the shape of the "particles" (e.g., pulverized product particles of the porous gel) is not particularly limited, and may be a spherical shape, a non-spherical shape, or the like, for example. In the present invention, the pulverized product particles may be sol-gel beaded particles, nanoparticles (hollow nanosilica/nanoballoon particles), nanofibers, or the like, for example.

In the production method of the present invention, it is preferable that a pulverization process used in at least one of the plurality of pulverization stages is different from a pulverization process used in at least one other pulverization stage. All the plurality of pulverization stages may use different pulverization processes, or some of the pulverization stages may use the same pulverization process. For example, when the pulverization is carried out as three-stage pulverization, all the three pulverization stages may use different pulverization processes (i.e., three pulverization processes), or two of the pulverization stages may use the same pulverization process and only the other one pulverization stage may use a different pulverization process. The pulverization process is not particularly limited, and examples thereof include cavitation processes and media-less processes to be described below.

In the production method of the present invention, the porous gel-containing liquid is, for example, a sol solution containing particles obtained by pulverizing the porous gel (pulverized product particles).

In the porous gel-containing liquid production method of the present invention, the plurality of pulverization stages may include a coarse pulverization stage and a full-scale pulverization stage. The pulverization may be performed in such a manner that, after massive sol particles are obtained by the coarse pulverization stage, sol particles maintaining a porous gel network are obtained by the full-scale pulverization stage. Each of the plurality of pulverization stages may be performed in a liquid.

In the porous gel-containing liquid production method of the present invention, the multi-stage pulverization may include first and second pulverization steps of pulverizing the gel of the porous body. The first pulverization step is a pulverization step in which the gel of the porous body is pulverized into sol particles having a volume average particle size from 1 to 100 μm, and the second pulverization step is a pulverization step in which, after the first pulverization step, the sol particles of the porous body are further pulverized into particles having a volume average particle size from 10 to 1000 nm.

In the production method of the present invention, the first pulverization step and the second pulverization step may each be performed in a liquid, for example. The liquid immediately after the first pulverization step has a shear viscosity in the range from 1 to 100 Pa·s, for example. The liquid immediately after the second pulverization step has a shear viscosity in the range from 1 mPa·s to 1 Pa·s, for example.

The production method of the present invention may further include, for example, a classification step of classifying the particles of the gel of the porous body after at least one pulverization step (e.g., at least one of the first pulverization step and the second pulverization step) in the multi-stage pulverization.

The production method of the present invention may further include, for example, a gelation step of causing gelation of a porous body in a massive form in a solvent to obtain the gel of the porous body. In this case, for example, the gelled porous body obtained in the gelation step is used in a pulverization step to be performed first (e.g., the first pulverization step) in the multi-stage pulverization.

The production method of the present invention further includes, for example, an aging step of aging the gelled porous body in a solvent. In this case, for example, the porous body after being subjected to the aging step is used in the pulverization step to be performed first (e.g., the first pulverization step) in the multi-stage pulverization.

The production method of the present invention may further include, for example, a solvent replacement step of replacing the solvent by another solvent after the gelation step. In this case, for example, the porous body in the another solvent is used in the pulverization step to be performed first (e.g., the first pulverization step) in the multi-stage pulverization.

In at least one of the pulverization steps (e.g., at least one of the first pulverization step and the second pulverization step) in the multi-stage pulverization in the production method of the present invention, pulverization of the porous body may be controlled while measuring the shear viscosity of the liquid, for example.

At least one of the pulverization steps (e.g., at least one of the first pulverization step and the second pulverization step) in the multi-stage pulverization in the production method of the present invention may be performed by high pressure media-less pulverization, for example.

In the production method of the present invention, the porous body may be, for example, a silicon compound at least containing three or less functional groups having saturated bonds.

The present invention will be described more specifically below with reference to illustrative examples. It is to be noted, however, that the present invention is by no means limited by the following descriptions.

As described above, the porous gel-containing liquid production method of the present invention is a method including a plurality of pulverization steps (e.g., a first pulverization step and a second pulverization step) of pulverizing a gel of the porous body, wherein the first pulverization step is a pulverization step in which the gel of the porous body is pulverized into particles having a volume average particle size from 1 to 100 μm, and the second pulverization step is a pulverization step in which, after the first pulverization step, the particles of the gel of the porous body are further pulverized into particles having a volume average particle size from 10 to 1000 nm.

The inventors of the present invention conducted diligent studies and achieved the present invention on the basis of the finding that, in a method for producing a porous gel-containing liquid, a highly homogeneous porous gel-containing liquid can be produced by pulverizing a porous gel in a massive form in a multi-stage pulverization process including a plurality of pulverization steps. The inventors of the present invention further conducted diligent studies, and found out that a porous gel-containing liquid with excellent homogeneity can be obtained when the porous gel-containing liquid is produced by a porous gel-containing liquid production method in which, in a first pulverization step, a gel of a porous body is pulverized into particles having a volume average particle size from 1 to 100 μm, and in a second pulverization step, the particles of the gel of the porous body are further pulverized into particles having a volume average particle size from 10 to 1000 nm.

The inventors of the present invention conducted diligent studies and achieved the present invention on the basis of the finding that, in a method for producing a porous gel-containing liquid, a highly homogeneous porous gel-containing liquid can be produced by pulverizing a porous gel in a massive form in a multi-stage pulverization process including a plurality of pulverization steps. The inventors of the present invention further conducted diligent studies, and found out that a porous gel-containing liquid with excellent homogeneity can be obtained when the porous gel-containing liquid is produced by a porous gel-containing liquid production method in which, in a first pulverization step, a gel of a porous body is pulverized into particles having a volume average particle size from 100 to 1 μm, and in a second pulverization step, the particles of the gel of the porous body are further pulverized into particles having a volume average particle size from 10 to 1000 nm.

According to the porous gel-containing liquid of the present invention, it is possible to form a functional porous body by, for example, forming a coating film of the porous gel-containing liquid and chemically bonding the pulverized products in the coating film to each other. According to the porous gel-containing liquid of the present invention, it is possible to provide the functional porous body in various objects, for example. Specifically, the functional porous body obtained using the porous gel-containing liquid of the present invention can be used as, for example, a heat insulating material, a sound absorbing material, a scaffold for regenerative medicine, a condensation prevention material, or an optical element, instead of an air layer. Therefore, the porous gel-containing liquid of the present invention and the production method thereof are useful in production of the functional porous body, for example.

The porous gel-containing liquid of the present invention has excellent homogeneity, as described above. Thus, for example, when the functional porous body is used as an optical element or the like, the optical element or the like can have a favorable appearance.

The porous gel-containing liquid of the present invention may be, for example, a porous gel-containing liquid for forming a high-void layer having a void fraction of at least 60 vol % by applying (coating) the porous gel-containing liquid to a base and then drying the porous gel-containing liquid. Also, the porous gel-containing liquid of the present invention may be, for example, a porous gel-containing liquid for forming a high-void porous body (a thick or massive bulk body) having a void fraction of at least 60 vol %. The bulk body can be obtained by bulk film formation using the porous gel-containing liquid, for example.

[1. Porous Gel-Containing Liquid and Production Method Thereof]

The porous gel-containing liquid of the present invention contains, for example, pulverized products obtained by pulverizing a porous gel in the above-described pulverization steps (e.g., the first pulverization step and the second pulverization step) and a solvent.

As described above, the porous gel-containing liquid production method of the present invention is a method including a plurality of pulverization steps (e.g., a first pulverization step and a second pulverization step) of pulverizing a gel of the porous body, for example. In the following, the porous gel-containing liquid production method of the present invention will be described mainly with reference to an example where the method includes a first pulverization step and a second pulverization step. Hereinafter, the plurality of pulverization steps (e.g., the first pulverization step and the second pulverization step) in the porous gel-containing liquid production method of the present invention altogether may be referred to as a "pulverization step".

The porous gel-containing liquid of the present invention can be used in production of a functional porous body that exhibits a function similar to that of an air layer (e.g., a function of realizing a low refractive index), as will be described below. Specifically, the porous gel-containing liquid obtained by the production method of the present invention contains pulverized products of a porous gel. In the pulverized products, the three-dimensional structure of the porous gel before being pulverized is destroyed. Thus, the pulverized products can form a new three-dimensional structure different from the three-dimensional structure of the porous gel before being pulverized. Accordingly, for example, a coating film (a precursor of a functional porous body) formed using the porous gel-containing liquid is a layer having a new pore structure (new void structure) that cannot be provided by a layer formed using the porous gel before being pulverized. With this configuration, the layer can exhibit a function similar to that of an air layer (e.g., a function of realizing a low refractive index comparable to that achieved by the air layer). In the porous gel-containing liquid of the present invention, the pulverized products may contain residual silanol groups, for example, so that, after a new three-dimensional structure has been formed as the coating film (the precursor of the functional porous body), the pulverized products can be chemically bonded to each other. With this configuration, while the thus-formed functional porous body has a structure with void spaces, it can maintain a sufficient strength and sufficient flexibility. Therefore, according to the present invention, it is possible to provide the functional porous body in various objects easily in a simple manner. The porous gel-containing liquid obtained by the production method of the present invention is very useful in production of the above-described porous structure that can serve as an alternative to an air layer, for example. In the case of an air layer, in order to form the air layer between components, it is necessary to laminate the components with a space therebetween by providing a spacer or the like, for example. In contrast, the functional porous body formed using the porous gel-containing liquid of the present invention can achieve a function similar to that of an air layer by merely disposing it at a desired site, for example. Therefore, as described above, the functional porous body can impart a function similar to that of the air layer to various objects more easily in a simpler manner as compared with the case of forming the air layer. Specifically, the porous structure can be used as, for example, a heat insulating material, a sound absorbing material, a scaffold for regenerative medicine, or a condensation prevention material, instead of the air layer.

The porous gel-containing liquid of the present invention also can be referred to as a solution for forming a functional porous body or a solution for forming a low refractive index layer, for example. In the porous gel-containing liquid of the present invention, the porous body is contained in the form of pulverized products thereof.

In the porous gel-containing liquid of the present invention, the volume average particle size of the pulverized products (porous gel particles) is in the range from 10 to 1000 nm, from 100 to 500 nm, or from 200 to 300 nm, for example. The volume average particle size indicates variations in particle size of the pulverized products in the porous gel-containing liquid of the present invention. The volume average particle size can be measured using a particle size distribution analyzer based on dynamic light scattering, laser diffraction, or the like, or using an electron microscope such as a scanning electron microscope (SEM) or a transmission electron microscope (TEM), for example.

In the porous gel-containing liquid of the present invention, the gel concentration of the pulverized products is not particularly limited, and is as follows, for example: the content of the particles with a particle size from 10 to 1000 nm is from 2.5 to 4.5 wt %, from 2.7 to 4.0 wt %, or from 2.8 to 3.2 wt %.

In the porous gel-containing liquid of the present invention, the porous body is not particularly limited, and may be a silicon compound, for example.

The silicon compound is not particularly limited, and may be a silicon compound at least containing three or less functional groups having saturated bonds, for example. The phrase "containing three or less functional groups having saturated bonds" means that the silicon compound contains three or less functional groups and these functional groups are bonded to silicon (Si) through saturated bonds.

The silicon compound may be a compound represented by the following chemical formula (2), for example.

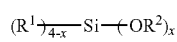
(2)

In the chemical formula (2), for example, X is 2, 3, or 4, $R^1$ and $R^2$ are each a linear or branched alkyl group, $R^1$ and $R^2$ may be the same or different from each other, $R^1$ may be the same or different from each other when X is 2, and $R^2$ may be the same or different from each other.

$\lambda$ and $R^1$ are the same as those in the following chemical formula (1), for example. Regarding $R^2$, reference can be made to the description as to the examples of $R^1$ in the chemical formula (1), for example.

A specific example of the silicon compound represented by the chemical formula (2) is the one in which X is 3, which is a compound represented by the following chemical formula (2'). In the chemical formula (2'), $R^1$ and $R^2$ are the same as those in the chemical formula (2). When $R^1$ and $R^2$ are both methyl groups, the silicon compound is trimethoxy (methyl)silane (also referred to as "MTMS" hereinafter).

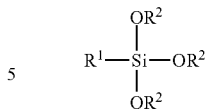
(2')

In the porous gel-containing liquid of the present invention, the concentration of the pulverized products of the porous gel in the solvent is not particularly limited, and is, for example, from 0.3% to 50% (v/v), from 0.5% to 30% (v/v), or from 1.0% to 10% (v/v). When the concentration of the pulverized products is too high, the fluidity of the porous gel-containing liquid is reduced considerably, which may result in aggregation and the formation of coating streaks during the coating, for example. On the other hand, when the concentration of the pulverized products is too low, it may take a long time to dry the solvent. Besides, the residual solvent immediately after the drying may increase to lower the void fraction, for example.

The physical properties of the porous gel-containing liquid of the present invention are not particularly limited. The shear viscosity of the porous gel-containing liquid is in the range from, for example, 1 mPa·s to 1 Pa·s, 1 mPa·s to 500 mPa·s, 1 mPa·s to 50 mPa·s, 1 mPa·s to 30 mPa·s, 1 mPa·s to 10 mPa·s, 10 mPa·s to 1 Pa·s, 10 mPa·s to 500 mPa·s, 10 mPa·s to 50 mPa·s, 10 mPa·s to 30 mPa·s, 30 mPa·s to 1 Pa·s, 30 mPa·s to 500 mPa·s, 30 mPa·s to 50 mPa·s, 50 mPa·s to 1 Pa·s, 50 mPa·s to 500 mPa·s, or 500 mPa·s to 1 Pa·s at the shear rate of, for example, 1000 1/s. When the shear viscosity is too high, for example, coating streaks may be formed, which may cause defects such as a decrease in transfer ratio in gravure coating. On the other hand, when the shear viscosity is too low, for example, it may not be possible to provide a sufficient wet thickness of the porous gel-containing liquid when coating the porous gel-containing liquid, so that a desired thickness cannot be obtained after drying.

In the porous gel-containing liquid of the present invention, the solvent may be a dispersion medium, for example. The dispersion medium (also referred to as "coating solvent" hereinafter) is not particularly limited, and may be, for example, a gelation solvent or pulverization solvent to be described below, and preferably is the pulverization solvent. The coating solvent may be an organic solvent having a boiling point of 130° C. or lower, for example. Specific examples of the coating solvent include isopropyl alcohol (IPA), ethanol, methanol, and butanol.

The porous gel-containing liquid of the present invention may be, for example, a sol particle solution, which is a sol obtained by dispersing the pulverized products in the dispersion medium. By coating the porous gel-containing liquid of the present invention onto the base, drying the porous gel-containing liquid, and chemically crosslinking the pulverized products in a bonding step to be described below, for example, a void layer having a film strength at or above a certain level can be formed continuously. The term "sol" as used in the present invention refers to a state where, by pulverizing the three-dimensional structure of a gel, pulverized products (i.e., porous sol particles each having a three-dimensional nanostructure holding part of the void structure) are dispersed in a solvent and exhibit fluidity.

The porous gel-containing liquid of the present invention may contain a catalyst for chemically bonding the pulverized products of the gel to each other, for example. The content of the catalyst is not particularly limited, and is, for example, from 0.01 to 20 wt %, from 0.05 to 10 wt %, or from 0.1 to 5 wt % relative to the weight of the pulverized products of the gel.

The porous gel-containing liquid of the present invention further may contain a crosslinking assisting agent for indirectly bonding the pulverized products of the gel to each other, for example. The content of the crosslinking assisting agent is not particularly limited, and is, for example, from 0.01 to 20 wt %, from 0.05 to 15 wt %, or from 0.1 to 10 wt % relative to the weight of the pulverized products of the gel.

The production method of the present invention will be described below. Unless otherwise stated, the following description also applies to the porous gel-containing liquid of the present invention.

In the production method of the present invention, a mixing step is the step of mixing particles (pulverized products) of the porous gel with the solvent. The mixing step is an optional step, and may or may not be performed. Specific examples of the mixing step include the step of mixing pulverized products of a gelled silicon compound (silicon compound gel) obtained from, for example, a silicon compound at least containing three or less functional groups having saturated bonds with a dispersion medium. In the present invention, the pulverized products of the porous gel can be obtained from the porous gel by the pulverization step to be described below. The pulverized products of the porous gel also can be obtained from the porous gel after being subjected to an aging treatment in an aging step to be described below, for example.

In the production method of the present invention, the gelation step is the step of causing gelation of a porous body in a massive form in a solvent to obtain the gel of the porous body. Specific examples of the gelation step include the step of forming a silicon compound gel by causing gelation of, for example, the silicon compounds at least containing three or less functional groups having saturated bonds in a solvent.

In the following, the gelation step will be described with reference to an example where the porous body is a silicon compound.

The gelation step is, for example, the step of causing gelation of the monomer silicon compounds through a dehydration condensation reaction in the presence of a dehydration condensation catalyst to obtaining a silicon compound gel. The silicon compound gel contains residual silanol groups, for example, and it is preferable to adjust the residual silanol groups as appropriate depending on the chemical bonding between the pulverized products of the silicon compound gel to be described below.

In the gelation step, the silicon compound is not particularly limited as long as it turns into a gel through a dehydration condensation reaction. By the dehydration condensation, the silicon compounds are bonded to each other, for example. The silicon compounds are bonded to each other by, for example, hydrogen bonding or intermolecular bonding.

The silicon compound may be a silicon compound represented by the following chemical formula (1), for example. The silicon compound represented by the chemical formula (1) has hydroxyl groups. Thus, silicon compounds represented by the chemical formula (1) can be bonded to each other by hydrogen bonding or intermolecular bonding via their hydroxyl groups, for example.

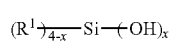
(1)

In the chemical formula (1), X is 2, 3, or 4, and $R^1$ is a linear or a branched alkyl group, for example. The number of carbon atoms in $R^1$ is from 1 to 6, from 1 to 4, or from 1 to 2, for example. The linear alkyl group is a methyl group, an ethyl group, a propyl group, a butyl group, a pentyl group, or a hexyl group, for example. The branched alkyl group is an isopropyl group or an isobutyl group, for example. The X is 3 or 4, for example.

A specific example of the silicon compound represented by the chemical formula (1) is the one in which X is 3, which is a compound represented by the following chemical formula (1'). In the chemical formula (1'), $R^1$ is the same as that in the chemical formula (1), and is a methyl group, for example. When $R^1$ is a methyl group, the silicon compound is tris(hydroxy)methylsilane. When X is 3, the silicon compound is a trifunctional silane having three functional groups, for example.

Another specific example of the silicon compound represented by the chemical formula (1) is the one in which X is 4. In this case, the silicon compound is a tetrafunctional silane having four functional groups, for example.

The silicon compound may be a precursor that forms the silicon compound represented by the chemical formula (1) when it is hydrolyzed, for example. The precursor is not limited as long as it can generate the silicon compound when it is hydrolyzed, for example. A specific example of the precursor is a compound represented by the above chemical formula (2).

When the silicon compound is the precursor represented by the chemical formula (2), the production method of the present invention may include the step of hydrolyzing the precursor prior to the gelation step, for example.

The method for causing the hydrolysis is not particularly limited, and the hydrolysis can be caused by a chemical reaction in the presence of a catalyst, for example. Examples of the catalyst include acids such as an oxalic acid and an acetic acid. The hydrolysis reaction can be caused by, for example, adding an oxalic acid aqueous solution dropwise slowly to a dimethyl sulfoxide solution of the silicon compound precursor at room temperature and then stirring the resultant mixture for about 30 minutes. In hydrolysis of the silicon compound precursor, for example, by hydrolyzing the alkoxy group of the silicon compound precursor completely, it is possible to more efficiently achieve gelation and aging to be performed subsequently and heating and immobilization to be performed after the formation of a void structure.

In the present invention, the silicon compound may be a hydrolysate of trimethoxy(methyl)silane, for example.

The monomer silicon compound is not particularly limited, and can be selected as appropriate depending on the intended use of a functional porous body to be produced, for example. In the production of the functional porous body, when prime importance is placed on a low refractive index, the silicon compound preferably is the trifunctional silane in terms of its excellent properties to allow realization of a low refractive index, for example. On the other hand, when prime importance is placed on the strength (e.g., abrasion resistance), the silicon compound preferably is the tetrafunctional silane from the viewpoint of imparting a high abrasion resistance. As a raw material of the silicon compound gel, only one type of silicon compounds may be used, or two or more types of silicon compounds may be used in combination, for example. Specifically, the silicon compounds may be made up of the trifunctional silane only, the tetrafunctional silane only, or both the trifunctional silane and the tetrafunctional silane, for example. Also, the silicon compounds further may include a silicon compound(s) other than the trifunctional silane and the tetrafunctional silane, for example. When two or more types of silicon compounds are used as the silicon compounds, the ratio thereof is not particularly limited, and can be set as appropriate.

The gelation of the porous body such as the silicon compound can be achieved by a dehydration condensation reaction of the porous body, for example. The dehydration condensation reaction preferably is performed in the presence of a catalyst, for example. Examples of the catalyst include dehydration condensation catalysts such as: acid catalysts including a hydrochloric acid, an oxalic acid, and a sulfuric acid; and base catalysts including ammonia, potassium hydroxide, sodium hydroxide, and ammonium hydroxide. The dehydration condensation catalyst may be either an acid catalyst or a base catalyst, and preferably is a base catalyst. In the dehydration condensation reaction, the amount of the catalyst to be added relative to the porous body is not particularly limited, and is, for example, from 0.01 to 10 mol, from 0.05 to 7 mol, or from 0.1 to 5 mol per mole of the porous body.

The gelation of the porous body such as the silicon compound preferably is performed in a solvent, for example. The proportion of the porous body in the solvent is not particularly limited. Examples of the solvent include dimethylsulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). One type of solvent may be used, or two or more types of solvents may be used in combination, for example. Hereinafter, the solvent used for the gelation also is referred to as a "gelation solvent".

The conditions for the gelation are not particularly limited. The treatment temperature for treating the solvent containing the porous body is, for example, from 20° C. to 30° C., from 22° C. to 28° C., or from 24° C. to 26° C., and the treatment time for treating the same is, for example, from 1 to 60 minutes, from 5 to 40 minutes, or from 10 to 30 minutes. When the dehydration condensation reaction is performed, the treatment conditions are not particularly limited, and the treatment conditions given above as examples also apply to the dehydration condensation reaction. When the porous body is a silicon compound, siloxane bonds are grown and primary particles of the silicon compound are formed by the gelation, for example. As the reaction further proceeds, the primary particles are connected in the form of a string of beads, whereby a gel having a three-dimensional structure is generated.

The form of the gel of the porous body obtained in the gelation step is not particularly limited. The term "gel" generally refers to a solidified state of a solute where particles of the solute have lost their independent mobility owing to interaction and form an aggregate. Among various types of gels, a "wet gel" generally refers to a gel containing a dispersion medium in which particles of a solute build a homogenous structure, and a "xerogel" generally refers to a gel from which a solvent has been removed and in which particles of a solute form a network structure with void spaces. In the present invention, the silicon compound gel preferably is a wet gel, for example. When the porous gel is a silicon compound gel, the amount of the residual silanol groups in the silicon compound gel is not particularly limited, and may be in the range to be described below, for example.

The porous gel obtained by the above-described gelation may be subjected to the first pulverization step as it is, or may be subjected to an aging treatment in the aging step prior to the first pulverization step, for example. The aging step is the step of aging the gelled porous body (porous gel) in a solvent. In the aging step, the conditions for the aging treatment are not particularly limited. For example, the aging treatment can be performed by incubating the porous gel at a predetermined temperature in the solvent. By the aging treatment, for example, it is possible to further grow the primary particles of the porous gel having a three-dimensional structure obtained by the gelation, thereby increasing the size of the particles themselves. As a result, the contact area at a neck portion where the particles are in contact with each other increases so that the contact state can be changed from point contact to surface contact, for example. When the porous gel is subjected to the above-described aging treatment, for example, the strength of the gel itself is improved, whereby the strength of the three-dimensional basic structures of the pulverized products after pulverization can be improved further. As a result, when a coating film is formed using the porous gel-containing liquid of the present invention, it is possible to reduce the possibility that, also in the drying step to be performed after the coating, pores in the void structure formed by deposition of the three-dimensional basic structures may become smaller as the solvent in the coating film volatilizes in the drying step, for example.

The temperature of the aging treatment is as follows. The lower limit thereof is, for example, 30° C. or higher, 35° C. or higher, or 40° C. or higher. The upper limit thereof is, for example, 80° C. or lower, 75° C. or lower, or 70° C. or lower. The range thereof is, for example, from 30° C. to 80° C., from 35° C. to 75° C., or from 40° C. to 70° C. The time of the aging treatment is not particularly limited. The lower limit thereof is, for example, 5 hours or more, 10 hours or more, or 15 hours or more. The upper limit thereof is, for example, 50 hours or less, 40 hours or less, or 30 hours or less. The range thereof is, for example, from 5 to 50 hours, from 10 to 40 hours, or from 15 to 30 hours. Optimal aging conditions preferably are set so that, for example, the size of the primary particles and the contact area at the neck portion are increased in the porous gel, as described above. Furthermore, in the aging step, the aging treatment preferably is set with consideration given to the boiling point of the solvent used in the aging step, for example. For example, when the aging temperature of the aging treatment is too high, the solvent may volatilize excessively to cause defectiveness such that the pores in the three-dimensional void structure are closed owing to the condensation of the coating solution. On the other hand, for example, when the aging temperature of the aging treatment is too low, the effect of the aging cannot be obtained sufficiently, so that variation in temperature over time in a mass production process increases, which may result in products with poor quality.

In the aging treatment, the same solvent as in the gelation step can be used, for example. Specifically, it is preferable that a reactant obtained after the gelation treatment (i.e., the solvent containing the porous gel) is subjected to the aging treatment as it is. When the porous gel is the silicon compound gel, the number of moles of residual silanol groups contained in the silicon compound gel after being subjected to the gelation and the subsequent aging treatment indicates, for example, the proportion of the residual silanol groups, assuming that the number of moles of the alkoxy groups in the raw material used for the gelation (e.g., the silicon compound or the precursor thereof) is 100. The lower limit thereof is, for example, 1% or more, 3% or more, or 5% or more. The upper limit thereof is, for example, 50% or less, 40% or less, or 30% or less. The range thereof is, for example, from 1% to 50%, from 3% to 40%, or from 5% to 30%. For the purpose of increasing the hardness of the silicon compound gel, it is preferable that the number of moles of the residual silanol groups is smaller, for example. When the number of moles of the residual silanol groups is too large, there is a possibility that, in the formation of the functional porous body, the void structure cannot be maintained until the crosslinking of the functional porous body precursor is completed, for example. On the other hand, when the number of moles of the residual silanol groups is too small, there is a possibility that, in the bonding step, the functional porous body precursor cannot be crosslinked, so that a sufficient film strength cannot be imparted, for example. The above description is directed to the residual silanol groups. When the silicon compound modified with any of other various reactive functional groups is used as a raw material of the silicon compound gel, for example, the same phenomenon applies to each of the reactive functional groups.

The porous gel obtained by the gelation may be subjected to a solvent replacement step after being subjected to the aging treatment in the aging step, or the porous gel obtained by the gelation may be subjected to the solvent replacement step without being subjected to the aging step, for example. In the solvent replacement step, the solvent is replaced by another solvent.

In the present invention, the pulverization step is the step of pulverizing the porous gel, as described above. For example, the porous gel after being subjected to the gelation step may be pulverized, or the aged porous gel after being subjected to the aging treatment may be pulverized.

The pulverization may be performed by, for example, subjecting a porous gel present in a liquid such as the gelation solvent to a pulverization treatment as it is. Alternatively, the pulverization may be performed by subjecting the porous gel to the solvent replacement step and then to the pulverization treatment. In the solvent replacement step, the solvent is replaced by another solvent. In the case where the porous gel is subjected to the aging step, for example, if the catalyst and solvent used in the gelation step and remaining after the aging step cause further gelation with time to affect the pot life of a porous gel-containing liquid to be obtained finally or reduce the drying efficiency at the time of drying a coating film formed using the porous gel-containing liquid, for example, it is preferable to replace the gelation solvent by another solvent. Hereinafter, such a solvent for replacement also may be referred to as a "pulverization solvent".

The pulverization may be performed using the same solvent as in the gelation step and the aging step or using a solvent different from the solvent used in the gelation step and the aging step, for example. In the former case, for example, a reactant obtained after the gelation step (e.g., the gelation solvent containing the porous gel) may be subjected to the aging step and the pulverizing treatment as it is. In the latter case, the reactant obtained after the gelation step (e.g., the gelation solvent containing the porous gel) may be subjected to the aging step as it is, the gelation solvent then may be replaced by another solvent, and thereafter, the porous gel in the another solvent may be subjected to a pulverization treatment.

The pulverization solvent is not particularly limited, and may be an organic solvent, for example. The organic solvent may be the one having a boiling point of 130° C. or lower, 100° C. or lower, or 85° C. or lower, for example. Specific examples thereof include isopropyl alcohol (IPA), ethanol, methanol, butanol, propylene glycol monomethyl ether (PGME), methyl cellosolve, acetone, and dimethylformamide (DMF). One type of pulverization solvent may be used, or two or more types of pulverization solvents may be used in combination.

The combination of the gelation solvent and the pulverization solvent is not particularly limited, and examples thereof include the combinations of: DMSO and IPA; DMSO and ethanol; DMSO and methanol; and DMSO and butanol. By replacing the gelation solvent by the pulverization solvent as described above, it is possible to form a more uniform coating film in the formation of the coating film to be described below, for example.

In the production method of the present invention, the pulverization steps include the first pulverization step and the second pulverization step, as described above. It is to be noted, however, that the pulverization steps may further include a pulverization step(s) in addition to the first pulverization step and the second pulverization step. That is, in the production method of the present invention, the pulverization is not limited to two-stage pulverization including two pulverization steps, and may be multi-stage pulverization including three or more pulverization steps.

The first pulverization step and the second pulverization step will be described below.

The first pulverization step is the step of pulverizing the porous gel. The second pulverization step is the step of further pulverizing particles of the porous gel after the first pulverization step.

Particles of the porous gel obtained after the first pulverization step have a volume average particle size from 1 to 100 µm, from 2 to 20 µm, or from 3 to 10 µm, for example. Particles of the porous gel obtained after the second pulverization step have a volume average particle size from 10 to 1000 nm, from 100 to 500 nm, or from 200 to 300 nm, for example. The volume average particle size indicates variations in particle size of the pulverized products in the porous gel-containing liquid of the present invention. The volume average particle size can be measured using a particle size distribution analyzer based on dynamic light scattering, laser diffraction, or the like, or using an electron microscope such as a scanning electron microscope (SEM) or a transmission electron microscope (TEM), for example.

The porous gel-containing liquid immediately after the first pulverization step has a shear viscosity in the range from, for example, 1 to 100 Pa·s, 2 to 50 Pa·s, or 5 to 10 Pa·s at a shear rate of 1000 1/s, for example. The porous gel-containing liquid immediately after the second pulverization step has a shear viscosity in the range from, for example, 1 mPa·s to 1 Pa·s, 2 mPa·s to 100 mPa·s, or 3 mPa·s to 50 mPa·s at a shear rate of 1000 1/s, for example.

The method for pulverizing the porous gel is not particularly limited. For example, the porous gel can be pulverized using a high pressure media-less pulverizer, an ultrasonic homogenizer, a high-speed rotary homogenizer, a high-pressure extruding pulverizer, or a wet media-less pulverizer utilizing any other cavitation phenomenon. The first pulverization step and the second pulverization step may be performed using the same pulverization method or using pulverization methods different from each other. Preferably, the first pulverization step and the second pulverization step are performed using pulverization methods different from each other.

As the pulverization method, it is preferable to use a method for pulverizing the porous gel by controlling an energy in at least one of the first pulverization step and the second pulverization step. The method for pulverizing the porous gel by controlling the energy may be a pulverization method using a high pressure media-less pulverizer or the like, for example.

While a method for pulverizing the porous gel using ultrasonic waves can achieve a high pulverization strength, it is difficult to control (adjust) the pulverization. In contrast, according to the method for pulverizing the porous gel by controlling the energy, it is possible to pulverize the porous gel while controlling (adjusting) the pulverization. Thus, a homogeneous porous gel-containing liquid can be produced with a limited amount of work. This allows the porous gel-containing liquid to be produced on a mass production basis, for example.

An apparatus that performs media pulverization, such as a ball mill, physically destroys the void structure of a gel during pulverization, for example. In contrast, a cavitation-type pulverizer such as a homogenizer is based on a media-less pulverization process, and separates the bonded surfaces of porous particles bonded relatively weakly and already contained in a gel three-dimensional structure with a high speed shear force, for example. By pulverizing the porous gel as described above, a new sol three-dimensional structure is obtained, and the thus-obtained three-dimensional structure can maintain a void structure having a particle size distribution within a certain range and can form a void structure again by deposition during coating and drying, for example. The conditions for the pulverization are not particularly limited, and preferably are conditions that allow a gel to be pulverized without causing volatilization of a solvent by imparting a high speed flow instantaneously, for example. For example, it is preferable to pulverize the gel in such a manner that pulverized products having the above described variations in particle size (e.g., volume average particle size or particle size distribution) can be obtained. If the amount of work such as the pulverization time or the pulverization strength is not sufficient, coarse particles may remain, so that there is a possibility that fine pores cannot be formed and a high quality cannot be achieved owing to increased defects in appearance, for example. On the other hand, if the amount of work is too much, sol particles to be obtained may be too small to achieve a desired particle size distribution. This may reduce the size of void spaces formed by deposition of the particles after coating and drying, so that a desired void fraction may not be achieved, for example.

It is preferable that, in at least one of the first pulverization step and the second pulverization step, pulverization of the porous body is controlled while measuring the shear viscosity of the liquid. Specific examples of the method for achieving such pulverization include: preparing a sol solution having both a desired shear viscosity and excellent homogeneity in the middle of the pulverization step; and performing in-line monitoring of the shear viscosity of the liquid and feeding the results of the in-line monitoring back to the pulverization step. According to this method, it is possible to produce a porous gel-containing liquid having both a desired shear viscosity and excellent homogeneity. Therefore, for example, the properties of the porous gel-containing liquid can be controlled depending on its intended use.

When the porous gel is the silicon compound gel, the proportion of residual silanol groups contained in the pulverized products after the pulverization step is not particularly limited. For example, the proportion of the residual silanol groups may be in the range given above as the example of the proportion thereof in the silicon compound gel after the aging treatment.

In the production method of the present invention, a classification step further may be performed after at least one of the pulverization steps (the first pulverization step and the second pulverization step). The classification step is the step of classifying the particles of the porous gel. The term "classification" means, for example, sorting particles of the porous gel according to their particle sizes. The method for classifying the particles is not particularly limited, and the classification can be carried out using a sieve. By carrying out the multi-stage pulverization, a porous gel-containing liquid to be obtained has excellent homogeneity as described above, so that, when a functional porous body formed using the porous gel-containing liquid is used as an optical element or the like, the optical element or the like can have a favorable appearance. When the classification treatment is further performed, it is possible to improve the appearance still further.

After the pulverization step and the classification step (optional), the proportion of the pulverized products in the solvent containing the pulverized products is not particularly limited, and may be in the range given above as the example of the proportion thereof in connection with the porous gel-containing liquid of the present invention, for example. The proportion may be, for example, the proportion in the pulverized product-containing solvent itself after the pulverization step, or may be the proportion in the solvent after the pulverization step and adjusted before being used as the porous gel-containing liquid.

A microporous particle (pulverized product of a gelled compound)-containing liquid (e.g., suspension) can be prepared in the above-described manner. By further adding a catalyst for chemically bonding the microporous particles after or during the preparation of the microporous particle-containing liquid, it is possible to prepare the liquid containing the microporous particles and the catalyst. The amount of the catalyst to be added is not particularly limited, and is, for example, from 0.01 to 20 wt %, from 0.05 to 10 wt %, or from 0.1 to 5 wt % relative to the weight of the pulverized products of the gelled silicon compound. The catalyst may be, for example, a catalyst that promotes crosslinking of the microporous particles. The chemical reaction for chemically bonding the microporous particles to each other preferably is a reaction utilizing a dehydration condensation reaction of residual silanol groups contained in silica sol molecules. By promoting the reaction between the hydroxyl groups in the silanol groups by the catalyst, the void structure can be cured in a short time, so that continuous film formation becomes possible. The catalyst may be a photoactive catalyst or a thermoactive catalyst, for example. With the use of the photoactive catalyst, the microporous particles can be bonded (e.g., crosslinked) to each other without heating in the step of forming the void layer, for example. Accordingly, in the step of forming the void layer, the shrinkage of the void layer as a whole is less liable to occur, so that it is possible to maintain a higher void fraction, for example. In addition to or instead of the catalyst, a substance that generates a catalyst (catalyst generator) may be used. For example, in addition to or instead of the photoactive catalyst, a substance that generates a catalyst when subjected to light irradiation (photocatalyst generator) may be used, and in addition to or instead of the thermoactive catalyst, a substance that generates a catalyst when heated (thermal catalyst generator) may be used. The photocatalyst generator is not particularly limited, and may be, for example, a photobase generator (a substance that generates a basic catalyst when subjected to light irradiation) or a photoacid generator (a substance that generates an acidic catalyst when subjected to light irradiation). Among them, the photobase generator is preferable. Examples of the photobase generator include 9-anthrylmethyl N,N-diethylcarbamate (trade name: WPBG-018), (E)-1-[3-(2-hydroxyphenyl)-2-propenoyl]piperidine (trade name: WPBG-027), 1-(anthraquinon-2-yl)ethyl imidazolecarboxylate (trade name: WPBG-140), 2-nitrophenylmethyl 4-methacryloyloxypiperidine-1-carboxylate (trade name: WPBG-165), 1,2-diisopropyl-3-[bis(dimethylamino) methylene]guanidium 2-(3-benzoylphenyl)propionate (trade name: WPBG-266), 1,2-dicyclohexyl-4,4,5,5-tetramethylbiguanidium n-butyltriphenylborate (trade name: WPBG-300), 2-(9-oxoxanthen-2-yl)propionic acid 1,5,7-triazabicyclo[4.4.0]dec-5-ene (Tokyo Kasei Kogyo Co., Ltd.), and a compound containing 4-piperidinemethanol (trade name: HDPD-PB100, manufactured by Heraeus). Note here that the above products with the trade names including "WPBG" are all manufactured by Wako Pure Chemical Industries, Ltd. Examples of the photoacid generator include aromatic sulfonium salt (trade name: SP-170, manufactured by ADEKA), triarylsulfonium salt (trade name: CPI101A, manufactured by San-Apro Ltd.), and aromatic iodonium salt (trade name: Irgacure 250, manufactured by Ciba Japan). The catalyst for chemically bonding the microporous particles to each other is not limited to the photoactive catalyst or the photocatalyst generator, and may be a thermoactive catalyst or a thermal catalyst generator, for example. Examples of the catalyst for chemically bonding the microporous particles to each other include: base catalysts such as potassium hydroxide, sodium hydroxide, and ammonium hydroxide; and acid catalysts such as a hydrochloric acid, an acetic acid, and an oxalic acid. Among them, the base catalysts are preferable. The catalyst or catalyst generator for chemically bonding the microporous particles to each other can be used by adding it to a sol particle solution (e.g., suspension) containing the pulverized products (microporous particles) immediately before coating the sol particle solution, or can be used in the form of a mixture of the catalyst or catalyst generator with a solvent, for example. The mixture may be, for example, a coating solution obtained by adding the catalyst or catalyst generator directly to and dissolving the catalyst or catalyst generator in the sol particle solution, a solution obtained by dissolving the catalyst or catalyst generator in a solvent, or a dispersion obtained by dispersing the catalyst or catalyst generator in a solvent. The solvent is not particularly limited, and may be water or a buffer solution, for example.

[2. Method for using Porous Gel-Containing Liquid]

The method for using the porous gel-containing liquid of the present invention will be described below with reference to, as an illustrative example, a method for producing a silicone porous body, which is an example of the functional porous body. It is to be noted, however, that the present invention is not limited thereto.

The method for producing a silicone porous body is characterized in that, for example, it includes: a precursor forming step of forming a precursor of the silicone porous body using the porous gel-containing liquid of the present invention; and a bonding step of chemically bonding pulverized products in the porous gel-containing liquid contained in the precursor to each other. The precursor also can be referred to as a coating film, for example.

According to the production method of the silicone porous body, a porous structure that exhibits a function similar to that of an air layer is formed, for example. The reason for this is speculated as follows, for example. However, the present invention is not limited by this speculation.

The porous gel-containing liquid of the present invention used in the production method of the silicone porous body contains pulverized products of the silicon compound gel. Thus, the porous gel-containing liquid is in the state where the three-dimensional structure of the gelled silica compound is dispersed in three-dimensional basic structures. Accordingly, in the production method of the silicone porous body, for example, when the precursor (e.g., coating film) is formed using the porous gel-containing liquid, the three-dimensional basic structures are deposited, whereby a void structure based on the three-dimensional basic structures is formed. That is, according to the production method of the silicone porous body, a new three-dimensional structure different from the three-dimensional structure of the silicon compound gel is provided by the pulverized products having the three-dimensional basic structures. Moreover, in the production method of the silicone porous body, the pulverized products are chemically bonded to each other, whereby the new three-dimensional structure is immobilized. Thus, while the silicone porous body obtained by the production method of the silicone porous body has a structure with void spaces, it can maintain a sufficient strength and sufficient flexibility. The silicone porous body obtained by the present invention is applicable to products in a wide range of fields, such as a heat insulating material, a sound absorbing material, an optical element, and an ink image receiving layer, for example, as a member utilizing void spaces. Further, the silicone porous body obtained by the present invention also can be used to produce laminated films with various functions.

Unless otherwise stated, the above description regarding the porous gel-containing liquid of the present invention also applies to the production method of the silicone porous body.

In the step of forming the precursor of the porous body, the porous gel-containing liquid of the present invention is coated onto a base, for example. By coating the porous gel-containing liquid of the present invention onto the base, drying the coating film, and then chemically bonding (e.g., crosslinking) the pulverized products in the bonding step, for example, a void layer having a film strength at or above a certain level can be formed continuously.

The amount of the porous gel-containing liquid to be coated onto the base is not particularly limited, and can be set as appropriate depending on a desired thickness of the silicone porous body, for example. As a specific example, when the silicone porous body having a thickness from 0.1 to 1000 µm is to be formed, the amount of the porous gel-containing liquid to be coated onto the base is as follows, for example: the amount of the pulverized products is from 0.01 to 60000 µg, from 0.1 to 5000 µg, or from 1 to 50 µg per square meter of the base. It is difficult to uniquely define a preferable amount of the porous gel-containing liquid to be coated, because it may be affected by the concentration of the coating solution, the coating method, etc., for example. However, in terms of productivity, it is preferable to make a coating layer as thin as possible. When the coating amount is too large, for example, it is likely that the solvent may be dried in a drying oven before it volatilizes. If the solvent is dried before the void structure is formed by the sedimentation and deposition of nano-sized pulverized sol particles in the solvent, formation of void spaces may be inhibited to lower the void fraction considerably. On the other hand, when the coating amount is too small, the risk of cissing due to unevenness, variation in hydrophilicity and hydrophobicity, etc. on the surface of the base may increase.

After coating the porous gel-containing liquid onto the base, the porous body precursor (coating film) may be subjected to a drying treatment. The purpose of the drying treatment is not only to remove the solvent in the porous body precursor (the solvent contained in the porous gel-containing liquid) but also to allow the sedimentation and deposition of the sol particles to occur to form a void structure during the drying treatment, for example. The temperature of the drying treatment is from 50° C. to 250° C., from 60° C. to 150° C., or from 70° C. to 130° C., for example, and the time of the drying treatment is from 0.1 to 30 minutes, from 0.2 to 10 minutes, or from 0.3 to 3 minutes, for example. In terms of continuous productivity and realization of high void fraction, it is preferable to set the temperature and the time of the drying treatment lower and shorter, respectively, for example. If the conditions are too stringent, the following problem may arise, for example. That is, when the base is a resin film, for example, the base may elongate in a drying oven as the temperature approaches the glass-transition temperature of the base, so that a void structure formed immediately after the coating may have defects such as cracks. On the other hand, when the conditions are too mild, the following problem may arise, for example. That is, the film may contain a residual solvent when it comes out of the drying oven, so that, if the film rubs against a roller in a subsequent step, defects in appearance such as scratches may be caused.

The drying treatment may be natural drying, heat drying, or drying under reduced pressure, for example. The drying method is not particularly limited, and a commonly used heating unit can be used, for example. Examples of the heating unit include a hot air fan, a heating roller, and a far-infrared heater. In particular, from the viewpoint of performing continuous production industrially, heat drying is preferable. It is preferable to use a solvent having a low surface tension for the purpose of inhibiting the shrinkage stress that may occur as the solvent volatizes during the drying process and inhibiting a crack phenomenon in the void layer (the silicone porous body) caused by the shrinkage stress. Examples of the solvent include, but are not limited to, lower alcohols (typically, isopropyl alcohol [IPA]), hexane, and perfluorohexane.

The base is not particularly limited. Preferable examples of the base include, but are not limited to, thermoplastic resin bases, glass bases, inorganic substrates typified by a silicon substrate, plastics formed of a thermosetting resin or the like, elements such as semiconductors, and carbon fiber materials typified by carbon nanotubes. The base may be in the form of a film or a plate, for example. Examples of the thermoplastic resin include polyethylene terephthalate (PET), acrylic resins, cellulose acetate propionate (CAP), cycloolefin polymer (COP), triacetate (TAC), polyethylene naphthalate (PEN), polyethylene (PE), and polypropylene (PP).

In the method for producing the silicone porous body, the bonding step is the step of chemically bonding the pulverized products contained in the porous body precursor (coating film) to each other. By the bonding step, the three-dimensional structures of the pulverized products in the porous body precursor are immobilized, for example. In the case of conventional immobilization by sintering, for example, a treatment at a high temperature of at least 200° C. is performed to induce the dehydration condensation of silanol groups and the formation of siloxane bonds. In the bonding step of the present invention, various additives that catalyze the above-described dehydration condensation reaction are caused to react with each other. With this configuration, for example, when the base is a resin film, it is possible to continuously form and immobilize the void structure at a relatively low drying temperature of around 100° C. and with a short treatment time of less than several minutes without damaging the base.

The method for achieving the above-described chemical bonding is not particularly limited, and can be determined as appropriate depending on the type of the silicon compound gel, for example. As a specific example, the chemical bonding can be achieved by chemically crosslinking the pulverized products. Besides this, for example, when inorganic particles such as titanium oxide particles are added to the pulverized products, the inorganic particles and the pulverized products may be chemically bonded by crosslinking. Furthermore, in the case of causing the pulverized products to carry a biocatalyst such as an enzyme, a site of the catalyst other than the catalytic site may be chemically crosslinked with the pulverized products. Therefore, the present invention is not only applicable to a void layer (silicone porous body) formed by sol particles bonded to each other, but the applicable range of the present invention can be expanded to an organic-inorganic hybrid void layer and a host-guest void layer, for example. It is to be noted, however, that the applicable range of the present invention is not limited thereto.

Depending on the type of the pulverized product of the silicon compound gel, the bonding step can be achieved by causing a chemical reaction in the presence of a catalyst, for example. The chemical reaction in the present invention preferably is a reaction utilizing a dehydration condensation reaction of residual silanol groups contained in the pulverized products of the silicon compound gel. By promoting the reaction between the hydroxyl groups in the silanol groups by the catalyst, the void structure can be cured in a short time, so that continuous film formation becomes possible. Examples of the catalyst include, but are not limited to, base catalysts such as potassium hydroxide, sodium hydroxide, and ammonium hydroxide and acid catalysts such as a hydrochloric acid, an acetic acid, and an oxalic acid. As a catalyst to be used in the dehydration condensation reaction, a base catalyst is particularly preferable. Also, catalysts that exhibit catalytic activity when irradiated with light (e.g., ultraviolet rays), such as photoacid generation catalysts and photobase generation catalysts, can be used preferably. The photoacid generation catalysts and photobase generation catalysts are not particularly limited, and are as described above, for example. As described above, it is preferable that the catalyst is used by adding it to a sol particle solution containing the pulverized products immediately before coating the sol particle solution, or used in the form of a mixture with a solvent, for example. The mixture may be, for example, a coating solution obtained by adding the catalyst directly to and dissolving the catalyst in the sol particle solution, a solution obtained by dissolving the catalyst in a solvent, or a dispersion obtained by dispersing the catalyst in a solvent. The solvent is not particularly limited, and examples thereof include water and buffer solutions, as described above.

The porous gel-containing liquid of the present invention may further contain, for example, a crosslinking assisting agent for indirectly bonding the pulverized products of the gel to each other. This crosslinking assisting agent enters the spaces between the respective particles (the pulverized products), where it interacts with or bonds to the particles. This allows the particles somewhat apart from each other to be bonded to each other. As a result, it becomes possible to efficiently improve the strength. The crosslinking assisting agent preferably is a multi-crosslinking silane monomer. Specifically, the multi-crosslinking silane monomer may have at least two and at most three alkoxysilyl groups, the chain length between the alkoxysilyl groups may be at least one and at most ten carbon atoms, and the multi-crosslinking silane monomer may contain an element other than carbon, for example. Examples of the crosslinking assisting agent include bis(trimethoxysilyl)ethane, bis(triethoxysilyl)ethane, bis(trimethoxysilyl)methane, bis(triethoxysilyl)methane, bis(triethoxysilyl)propane, bis(trimethoxysilyl)propane, bis(triethoxysilyl)butane, bis(trimethoxysilyl)butane, bis(triethoxysilyl)pentane, bis(trimethoxysilyl)pentane, bis(triethoxysilyl)hexane, bis(trimethoxysilyl)hexane, bis(trimethoxysilyl)-N-butyl-N-propyl-ethane-1,2-diamine, tris-(3-trimethoxysilylpropyl)isocyanurate, and tris-(3-triethoxysilylpropyl)isocyanurate. The amount of the crosslinking assisting agent to be added is not particularly limited, and is, for example, in the range from 0.01 wt % to 20 wt %, from 0.05 wt % to 15 wt %, or from 0.1 wt % to 10 wt % relative to the weight of the pulverized products of the silicon compound.

The chemical reaction in the presence of the catalyst can be caused by, for example: subjecting the coating film containing the catalyst or catalyst generator previously added to the porous gel-containing liquid to heating or light irradiation; subjecting the coating film to heating or light irradiation after spraying the catalyst or catalyst generator over the coating film; or subjecting the coating film to heating or light irradiation while spraying the catalyst or catalyst generator over the coating film. For example, when the catalyst is a photoactive catalyst, the silicone porous body can be formed by chemically bonding the microporous particles to each other by light irradiation. When the catalyst is a thermoactive catalyst, the silicone porous body can be formed by chemically bonding the microporous particles to each other by heating. The irradiation dose (energy) of light in the above light irradiation is not particularly limited, and is, for example, from 200 to 800 mJ/cm$^2$, from 250 to 600 mJ/cm$^2$, or from 300 to 400 mJ/cm$^2$, in terms of light at a wavelength of 360 nm. The accumulated amount of light preferably is 200 mJ/cm$^2$ or more from the viewpoint of preventing the problem in that, owing to insufficient irradiation dose, degradation of the catalyst generator by light absorption may not proceed sufficiently, so that the catalyst generator cannot exhibit its effect sufficiently. The accumulated amount of light preferably is 800 mJ/cm$^2$ or less, from the viewpoint of preventing damage to the base disposed under the void layer so as to prevent the formation of heat wrinkles. The wavelength of light in the above light irradiation is not particularly limited, and is, for example, from 200 to 500 nm or from 300 to 450 nm. The irradiation time in the above light irradiation is not particularly limited, and is, for example, from 0.1 to 30 minutes, from 0.2 to 10 minutes, or from 0.3 to 3 minutes. The conditions for the heat treatment are not particularly limited. The heating temperature is from 50° C. to 250° C., from 60° C. to 150° C., or from 70° C. to 130° C., for example, and the heating time is from 0.1 to 30 minutes, from 0.2 to 10 minutes, or from 0.3 to 3 minutes, for example. It is preferable to use, for example, a solvent having a low surface tension for the purpose of inhibiting the shrinkage stress that may occur as the solvent volatizes during the drying process and inhibiting a crack phenomenon in the void layer caused by the shrinkage stress. Examples of the solvent include, but are not limited to, lower alcohols (typically, isopropyl alcohol [IPA]), hexane, and perfluorohexane.

The silicone porous body according to the present invention can be produced in the above-described manner. However, the production method of the present invention is not limited thereto.

The obtained silicone porous body of the present invention may be subjected to a strength improving step of improving the strength (this step also may be referred to as an "aging step" hereinafter) through thermal aging or the like, for example. For example, when the silicone porous body of the present invention is laminated on a resin film, the peel adhesion strength on the resin film can be improved by the strength improving step (aging step). In the strength improving step (aging step), the silicone porous body of the present invention may be heated, for example. The temperature of the aging step is from 40° C. to 80° C., from 50° C. to 70° C., or from 55° C. to 65° C., for example. The reaction time is from 5 to 30 hours, from 7 to 25 hours, or from 10 to 20 hours, for example. By setting the heating temperature low in the aging step, for example, the peel adhesion strength can be improved while inhibiting the shrinkage of the silicone porous body, so that the silicone porous body can attain both a high void fraction and a high strength.

Although the phenomenon occurring in the strength improving step (aging step) and the mechanism thereof are unknown, it is considered that, for example, the catalyst contained in the silicone porous body of the present invention causes the chemical bonding (e.g., a crosslinking reaction) of the microporous particles to further proceed, thereby improving the strength. As a specific example, when residual silanol groups (OH groups) are present in the silicone porous body, it is considered that the residual silanol groups are chemically bonded to each other through a crosslinking reaction. The catalyst contained in the silicone porous body of the present invention is not particularly limited, and may be, for example, a catalyst used in the bonding step, a basic substance generated by a photobase generation catalyst used in the bonding step when the photobase generation catalyst is subjected to light irradiation, or an acidic substance generated by a photoacid generation catalyst used in the bonding step when the photoacid generation catalyst is subjected to light irradiation. It is to be noted, however, that this explanation is merely illustrative and does not limit the present invention.

A pressure-sensitive adhesive/adhesive layer further may be formed on the silicone porous body of the present invention (the pressure-sensitive adhesive/adhesive layer forming step). Specifically, the pressure-sensitive adhesive/adhesive layer may be formed by applying (coating) a pressure-sensitive adhesive or an adhesive to the silicone porous body of the present invention, for example. Alternatively, the pressure-sensitive adhesive/adhesive layer may be formed on the silicone porous body of the present invention by adhering, e.g., an adhesive tape including a base and the pressure-sensitive adhesive/adhesive layer laminated on the base to the silicone porous body with the pressure-sensitive adhesive/adhesive layer side of the adhesive tape facing the silicone porous body. In this case, the base of the adhesive tape may be left on the adhesive tape or may be peeled off from the pressure-sensitive adhesive/adhesive layer. In the present invention, the terms "pressure-sensitive adhesive" and "pressure-sensitive adhesive layer" respectively refer to an agent and a layer that adhere a substance in a peelable manner, for example. In the present invention, the terms "adhesive" and "adhesive layer" respectively refer to an agent and a layer that adhere a substance in a non-peelable manner, for example. It is to be noted, however, that, in the present invention, the "pressure-sensitive adhesive" and the "adhesive" are not always clearly distinguishable from each other, and also, the "pressure-sensitive adhesive layer" and the "adhesive layer" are not always clearly distinguishable from each other. In the present invention, a pressure-sensitive adhesive or an adhesive for forming the pressure-sensitive adhesive/adhesive layer is not particularly limited, and a commonly used pressure-sensitive adhesive or adhesive can be used, for example. Examples of the pressure-sensitive adhesive and the adhesive include: polymer adhesives such as acrylic adhesives, vinyl alcohol adhesives, silicone adhesives, polyester adhesives, polyurethane adhesives, and polyether adhesives; and rubber adhesives. Further, the pressure-sensitive adhesive and the adhesive may be an adhesive composed of a water-soluble crosslinking agent of a vinyl alcohol polymer such as glutaraldehyde, melamine, or an oxalic acid. Only one type of pressure-sensitive adhesive or adhesive may be used, or two or more types of pressure-sensitive adhesives or adhesives may be used in combination (they may be mixed together or may be laminated, for example). The thickness of the pressure-sensitive adhesive/adhesive layer is not particularly limited, and is, for example, from 0.1 to 100 μm, from 5 to 50 μm, from 10 to 30 μm, or from 12 to 25 μm.

Further, an intermediate layer may be formed between the silicone porous body of the present invention and the pressure-sensitive adhesive/adhesive layer by causing the silicone porous body of the present invention to react with the pressure-sensitive adhesive/adhesive layer (an intermediate layer forming step). The intermediate layer allows the silicone porous body of the present invention to be less liable to be peeled off from the pressure-sensitive adhesive/adhesive layer, for example. Although the reason (mechanism) for this is unknown, it is speculated that the above effect is brought about by the anchoring property (anchor effect) of the intermediate layer, for example. The anchoring property (anchor effect) is a phenomenon (effect) that the interface between the void layer and the intermediate layer is fixed firmly because the intermediate layer is entangled in the void layer in the vicinity of the interface. It is to be noted, however, that the above-described reason (mechanism) merely is an example of the reason (mechanism) based on speculation and does not limit the present invention. The reaction between the silicone porous body of the present invention and the pressure-sensitive adhesive/adhesive layer is not particularly limited, and may be a reaction caused by a catalyst, for example. The catalyst may be a catalyst contained in the silicone porous body of the present invention, for example. Specifically, the catalyst may be, for example, a catalyst used in the bonding step, a basic substance generated from a photobase generation catalyst used in the bonding step when the photobase generation catalyst is subjected to light irradiation, or an acidic substance generated from a photoacid generation catalyst used in the bonding step when the photoacid generation catalyst is subjected to light irradiation. The reaction between the silicone porous body of the present invention and the pressure-sensitive adhesive/adhesive layer may be, for example, a reaction (e.g., a crosslinking reaction) that newly generates chemical bonds. The reaction temperature is, for example, from 40° C. to 80° C., from 50° C. to 70° C., or from 55° C. to 65° C. The reaction time is, for example, from 5 to 30 hours, from 7 to 25 hours, or from 10 to 20 hours. This intermediate layer forming step may also serve as the strength improving step (aging step) of improving the strength of the silicone porous body of the present invention.

The silicone porous body of the present invention obtained in this manner may be further laminated on another film (layer) to form a laminated structure including the porous structure, for example. In this case, the respective components of the laminated structure may be laminated via a pressure-sensitive adhesive or an adhesive, for example.

The respective components may be laminated by continuous processing using a long film (e.g., the so-called "roll-to-roll" process) in terms of efficiency, for example. When the base is a molded product, an element, or the like, the components that have been subjected to batch processing may be laminated on the base.

Figure 2:
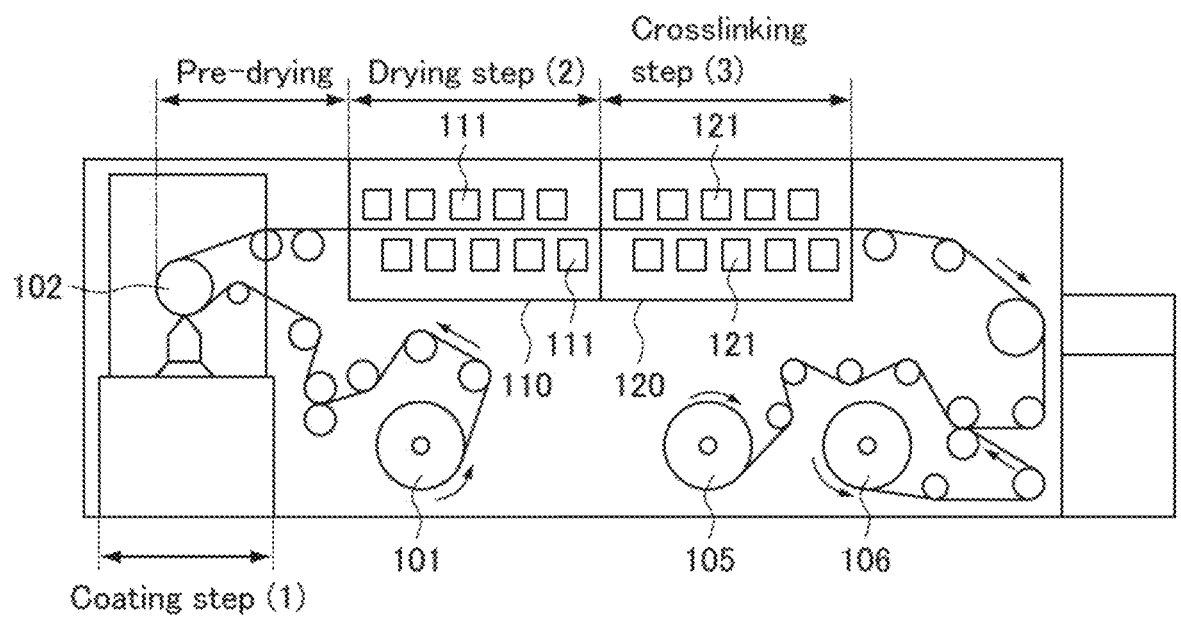
FIG. 2 is a schematic view showing an example of some steps in a method for producing a functional porous body using the porous gel-containing liquid of the present invention and an apparatus used in the method.
Figure 3:
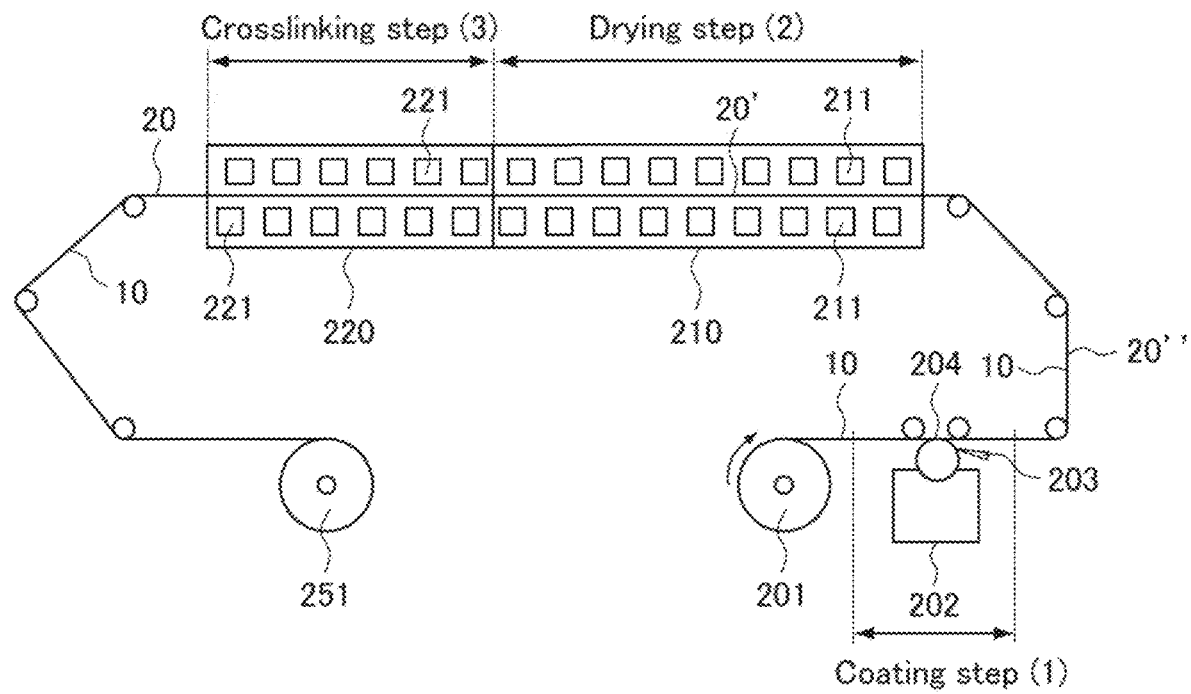
FIG. 3 is a schematic view showing another example of some steps in a method for producing a functional porous body using the porous gel-containing liquid of the present invention and an apparatus used in the method.

The method for forming the silicone porous body on a base using the porous gel-containing liquid of the present invention will be described below with reference to illustrative examples shown in FIGS. 1 to 3. FIG. 2 shows a process in which, after the silicone porous body is formed into a film, a protective film is attached to the thus-formed film and the thus-obtained laminate is wound up. However, in the case where the silicone porous body is laminated on another functional film, this may be achieved in the above-described manner, or alternatively, in the following manner: after performing coating and drying for forming the functional film, the silicone porous body formed into a film is adhered to the functional film immediately before being wound-up. It should be noted that the film forming processes shown in FIGS. 1 to 3 are merely illustrative and do not limit the present invention by any means.

FIG. 1 is a sectional view schematically showing an example of steps included in the method for forming a silicone porous body on a base. In FIG. 1, the method for forming a silicone porous body includes: a coating step (1) of coating a porous gel-containing liquid 20" of the present invention onto a base 10; a coating film forming step (drying step) (2) of drying the porous gel-containing liquid 20" to form a coating film 20', which is a precursor layer of a silicone porous body; and a chemical treatment step (e.g., crosslinking treatment step) (3) of subjecting the coating film 20' to a chemical treatment (e.g., crosslinking treatment) to form a silicone porous body 20. In the above-described manner, as shown in FIG. 1, the silicone porous body 20 can be formed on the base 10. The method for forming the silicone porous body may include any step other than the steps (1) to (3) as appropriate, or may not include any step other than the steps (1) to (3).

In the coating step (1), the method for coating the porous gel-containing liquid 20" is not particularly limited, and a commonly used coating method can be employed. Examples of the coating method include a slot die method, a reverse gravure coating method, a micro-gravure method (micro-gravure coating method), a dip method (dip coating method), a spin coating method, a brush coating method, a roller coating method, a flexography method, a wire-bar coating method, a spray coating method, an extrusion coating method, a curtain coating method, and a reverse coating method. Among them, from the viewpoint of productivity, smoothness of a coating film, etc., the extrusion coating method, the curtain coating method, the roller coating method, and the micro-gravure coating method are preferable. The coating amount of the porous gel-containing liquid 20" is not particularly limited, and can be set as appropriate so that the porous structure (silicone porous body) 20 having a suitable thickness is obtained, for example. The thickness of the porous structure (silicone porous body) 20 is not particularly limited, and is as described above, for example.

In the drying step (2), the porous gel-containing liquid 20" is dried (i.e., a dispersion medium contained in the porous gel-containing liquid 20" is removed) to form the coating film (precursor layer) 20'. The conditions for the drying treatment are not particularly limited, and may be as described above.

In the chemical treatment step (3), the coating film 20' containing a catalyst (e.g., a photoactive catalyst, a photocatalyst generator, a thermoactive catalyst, or a thermal catalyst generator) added prior to the coating step is irradiated with light or heated, whereby the pulverized products in the coating film (precursor) 20' are chemically bonded (e.g., crosslinked) to each other. As a result, the silicone porous body 20 is formed. The conditions for the light irradiation and heating in the chemical treatment step (3) are not particularly limited, and may be as described above.

FIG. 2 schematically shows an example of a slot die coating apparatus and the method for forming a silicone porous body using the same. While FIG. 2 is a sectional view, hatching is omitted for the sake of clarity.

As shown in FIG. 2, the respective steps in the method using this apparatus are performed while conveying a base 10 in one direction by rollers. The conveyance speed is not particularly limited, and is, for example, from 1 to 100 m/min, from 3 to 50 m/min, or from 5 to 30 m/min.

First, while feeding and conveying the base 10 from a feed roller 101, a coating step (1) of coating a porous gel-containing liquid 20" of the present invention onto the base is performed on a coating roller 102. Subsequently, in an oven zone 110, a drying step (2) is performed. In the coating apparatus shown in FIG. 2, a pre-drying step is performed after the coating step (1) and prior to the drying step (2). The pre-drying step can be performed at room temperature without heating. In the drying step (2), heating units 111 are used. As the heating unit 111, a hot air fan, a heating roll, a far-infrared heater, or the like can be used as appropriate, as described above. Also, for example, the drying step (2) may be divided into two or more steps, and the drying temperatures in the respective steps may be set so that the drying temperature in the first step increases toward the step(s) subsequent thereto.

After the drying step (2), a chemical treatment step (3) is performed in a chemical treatment zone 120. In the chemical treatment step (3), when a coating film 20' after being dried contains a photoactive catalyst, for example, the coating film 20' is irradiated with light emitted from lamps (light irradiation units) 121 disposed above and below the base 10. On the other hand, when the coating film 20' after being dried contains a thermoactive catalyst, for example, hot air fans (heating units) are used instead of the lamps (light irradiation units) 121, and the base 10 is heated using the hot air fans 121 disposed above and below the base 10. By this crosslinking treatment, pulverized products in the coating film 20' are chemically bonded to each other, whereby a silicone porous body 20 is cured and strengthened. Then, after the chemical treatment step (3), a laminate obtained by forming the silicone porous body 20 on the base 10 is wound up by a wind-up roller 105. In FIG. 2, the porous structure 20 in the laminate is protected by being covered with a protecting sheet fed by a roller 106. Instead of the protecting sheet, another layer formed of a long film may be laminated on the porous structure 20.

FIG. 3 schematically shows an example of a coating apparatus for a micro-gravure method (micro-gravure coating) and the method for forming a porous structure using the same. While FIG. 3 is a sectional view, hatching is omitted for the sake of clarity.

As shown in FIG. 3, the respective steps in the method using this apparatus are performed while conveying a base 10 in one direction by rollers, as in the example shown in FIG. 2. The conveyance speed is not particularly limited, and is, for example, from 1 to 100 m/min, from 3 to 50 m/min, or from 5 to 30 m/min.

First, while feeding and conveying the base 10 from a feed roller 201, a coating step (1) of coating a porous gel-containing liquid 20" of the present invention onto the base 10 is performed. As shown in FIG. 3, the porous gel-containing liquid 20" is coated using a liquid reservoir 202, a doctor (doctor knife) 203, and a micro-gravure coater 204. Specifically, the porous gel-containing liquid 20" in the liquid reservoir 202 is caused to be carried on the surface of the micro-gravure coater 204, and then is coated on the surface of the base 10 with the micro-gravure coater 204 while controlling the thickness of the coating film of the porous gel-containing liquid 20" to a predetermined thickness with the doctor 203. It is to be noted here that the micro-gravure coater 204 merely is an example of a coating unit. The coating unit is not limited to the micro-gravure coater 204, and any coating unit may be used.

Next, a drying step (2) is performed. Specifically, as shown in FIG. 3, the base 10 having the porous gel-containing liquid 20" coated thereon is conveyed to an oven zone 210. The porous gel-containing liquid 20" is dried by being heated with heating units 211 disposed in the oven zone 210. The heating units 211 may be the same as those in FIG. 2, for example. The drying step (2) may be divided into a plurality of steps by dividing the oven zone 210 into a plurality of sections, for example. The drying temperatures in the respective steps may be set so that the drying temperature in the first step increases toward the step(s) subsequent thereto. After the drying step (2), a chemical treatment step (3) is performed in a chemical treatment zone 220. In the chemical treatment step (3), when a coating film 20' after being dried contains a photoactive catalyst, for example, the coating film 20' is irradiated with light emitted from lamps (light irradiation units) 221 disposed above and below the base 10. On the other hand, when the coating film 20' after being dried contains a thermoactive catalyst, for example, hot air fans (heating units) are used instead of the lamps (light irradiation units) 221, and the base 10 is heated using the hot air fans 221 disposed below the base 10. By this crosslinking treatment, pulverized products in the coating film 20' are chemically bonded to each other, whereby a silicone porous body 20 is formed.

Then, after the chemical treatment step (3), a laminate obtained by forming the silicone porous body 20 on the base 10 is wound up by a wind-up roller 251. Thereafter, another layer may be laminated on the laminate, for example. Further, before the laminate is wound up by the wind-up roller 251, another layer may be laminated on the laminate, for example.

Figure 4:
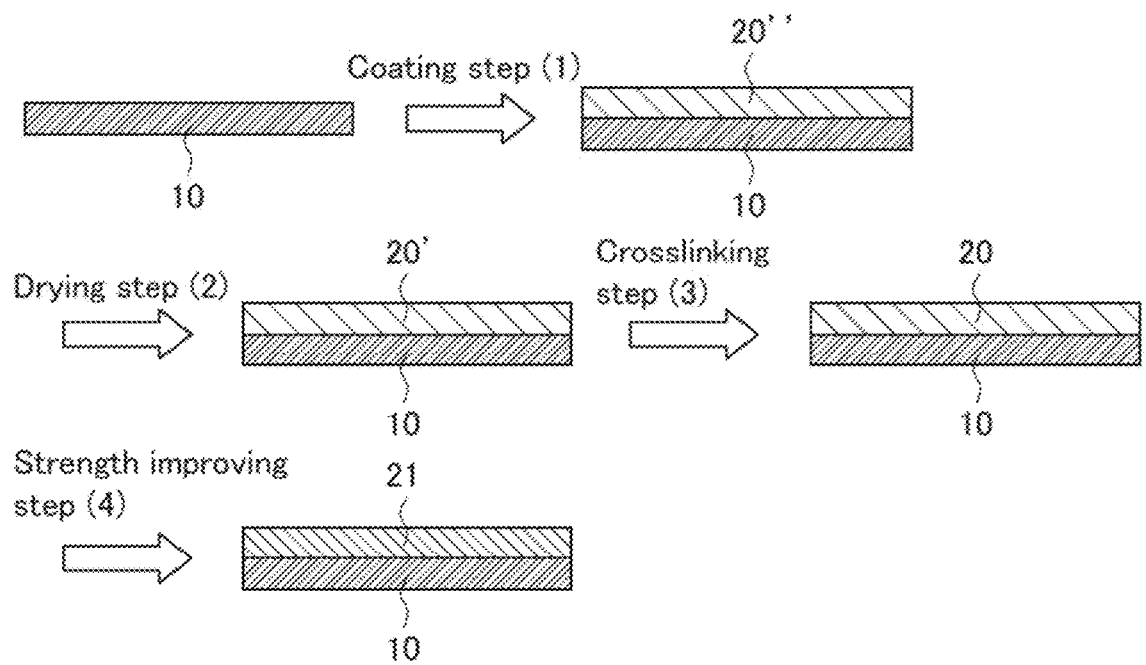
FIG. 4 is a sectional view schematically illustrating another example of a process of the method for forming the functional porous body on the base in the present invention.
Figure 5:
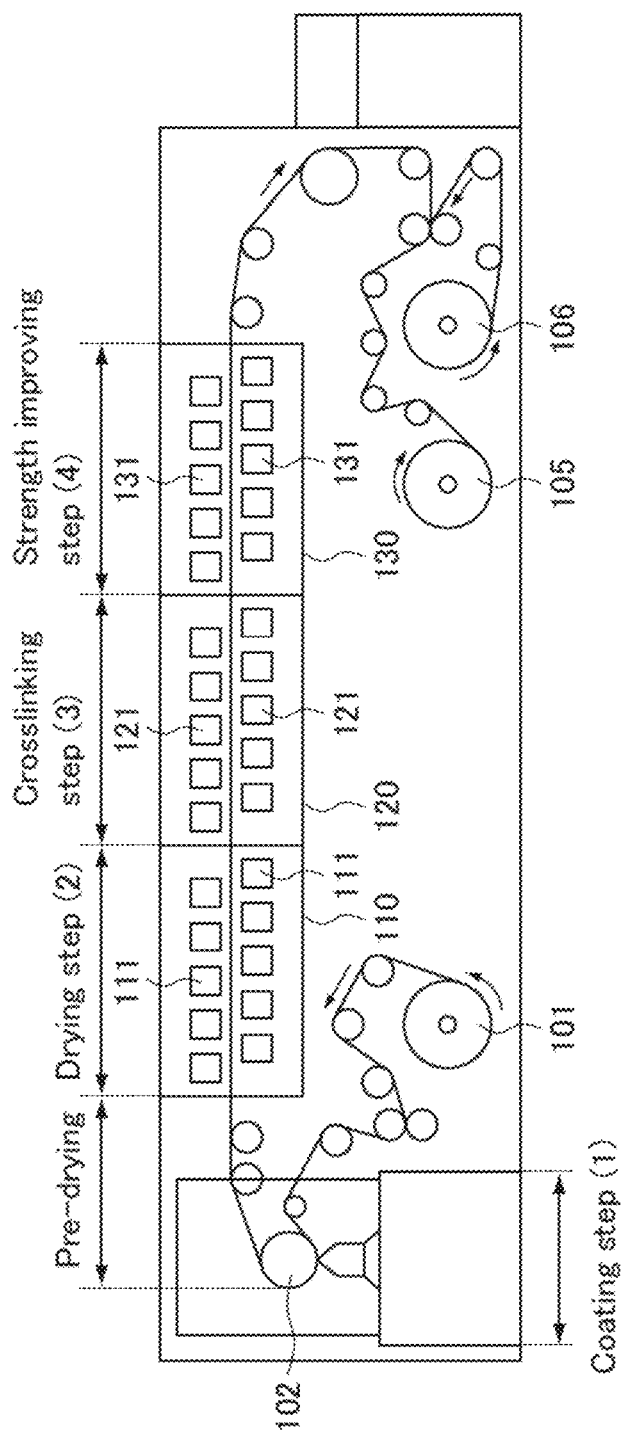
FIG. 5 is a schematic view showing still another example of some steps in a method for producing a functional porous body using the porous gel-containing liquid of the present invention and an apparatus used in the method.
Figure 6:
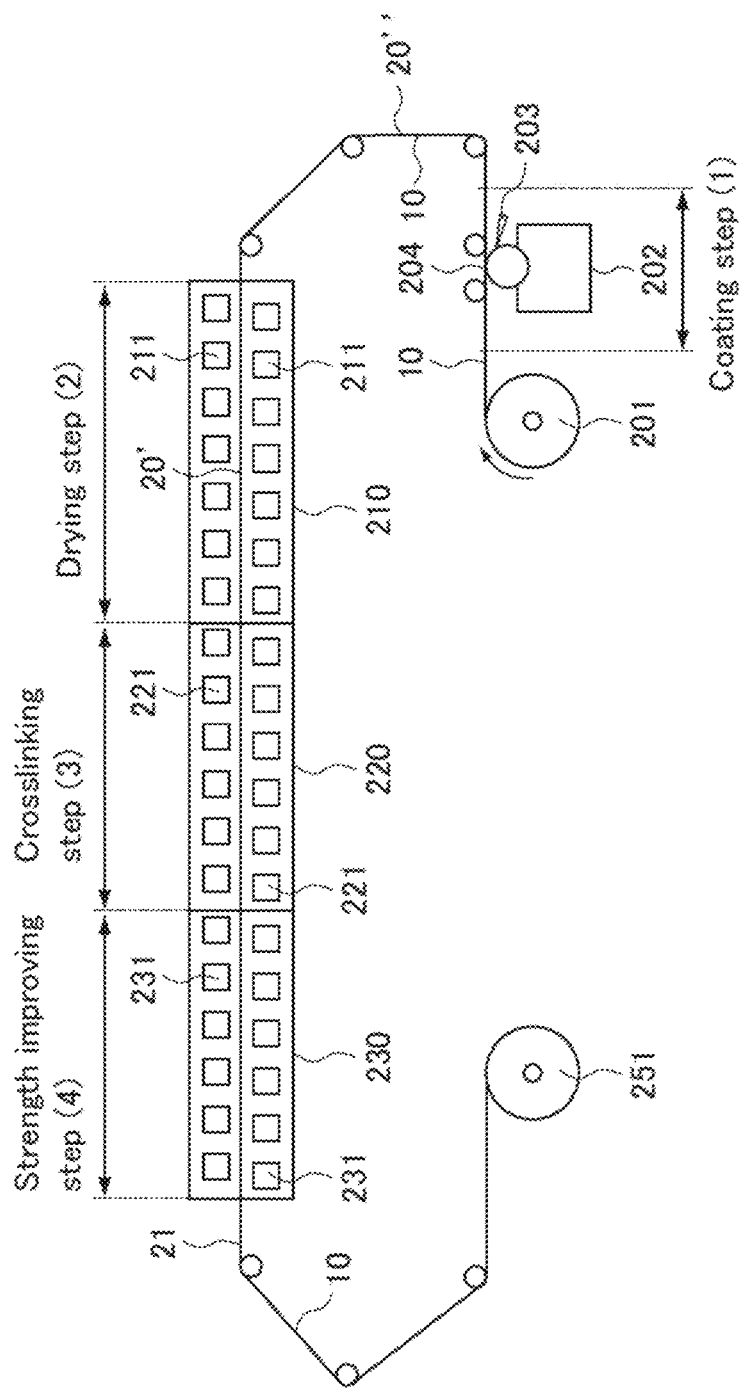
FIG. 6 is a schematic view showing still another example of some steps in a method for producing a functional porous body using the porous gel-containing liquid of the present invention and an apparatus used in the method.

FIGS. 4 to 6 show other examples of continuous processing steps in the method for forming the silicone porous body of the present invention. As can be seen from the sectional view of FIG. 4, the method shown in FIG. 4 is the same as the methods shown in FIGS. 1 to 3, except that a strength improving step (aging step) (4) is performed after a chemical treatment step (e.g., crosslinking treatment step) (3) of forming a silicone porous body 20. As shown in FIG. 4, in the strength improving step (aging step) (4), the strength of the silicone porous body 20 is improved to provide a silicone porous body 21 with an improved strength. The strength improving step (aging step) (4) is not particularly limited, and is as described above, for example.

FIG. 5 is a schematic view showing an example of a slot die coating apparatus and the method for forming an silicone porous body using the same, which is different from the example shown in FIG. 2. As can be seen from FIG. 5, the coating apparatus shown in FIG. 5 is the same as the coating apparatus shown in FIG. 2, except that it includes, right next to a chemical treatment zone 120 in which a chemical treatment step (3) is performed, a strength improving zone (aging zone) 130 in which the strength improving step (aging step) (4) is performed. That is, after the chemical treatment step (3), the strength improving step (aging step) (4) is performed in the strength improving zone (aging zone) 130 to improve the peel adhesion strength of the silicone porous body 20 on a resin film (base) 10, thereby forming an silicone porous body 21 having an improved peel adhesion strength. The strength improving step (aging step) (4) may be performed by heating the silicone porous body 20 in the same manner as described above using hot air fans (heating units) 131 disposed above and below the base 10, for example. The heating temperature, heating time, etc., are not particularly limited, and are as described above, for example. Thereafter, as in the example shown in FIG. 2, a laminated film obtained by forming the silicone porous body 21 on the base 10 is wound up by a wind-up roller 105.

FIG. 6 is a schematic view showing an example of a coating apparatus for a micro-gravure method (micro-gravure coating method) and the method for forming the porous structure using the same, which is different from the example shown in FIG. 3. As can be seen from FIG. 6, the coating apparatus shown in FIG. 6 is the same as the coating apparatus shown in FIG. 3, except that it includes, right next to a chemical treatment zone 220 in which a chemical treatment step (3) is performed, a strength improving zone (aging zone) 230 in which a strength improving step (aging step) (4) is performed. That is, after the chemical treatment step (3), the strength improving step (aging step) (4) is performed in the strength improving zone (aging zone) 130 to improve the peel adhesion strength of the silicone porous body 20 on a resin film (base) 10, thereby forming an silicone porous body 21 having an improved peel adhesion strength. The strength improving step (aging step) (4) may be performed by heating the silicone porous body 20 in the same manner as described above using hot air fans (heating units) 231 disposed above and below the base 10, for example. The heating temperature, heating time, etc., are not particularly limited, and are as described above, for example. Thereafter, as in the example shown in FIG. 3, a laminated film obtained by forming the silicone porous body 21 on the base 10 is wound up by a wind-up roller 251.

Figure 7:
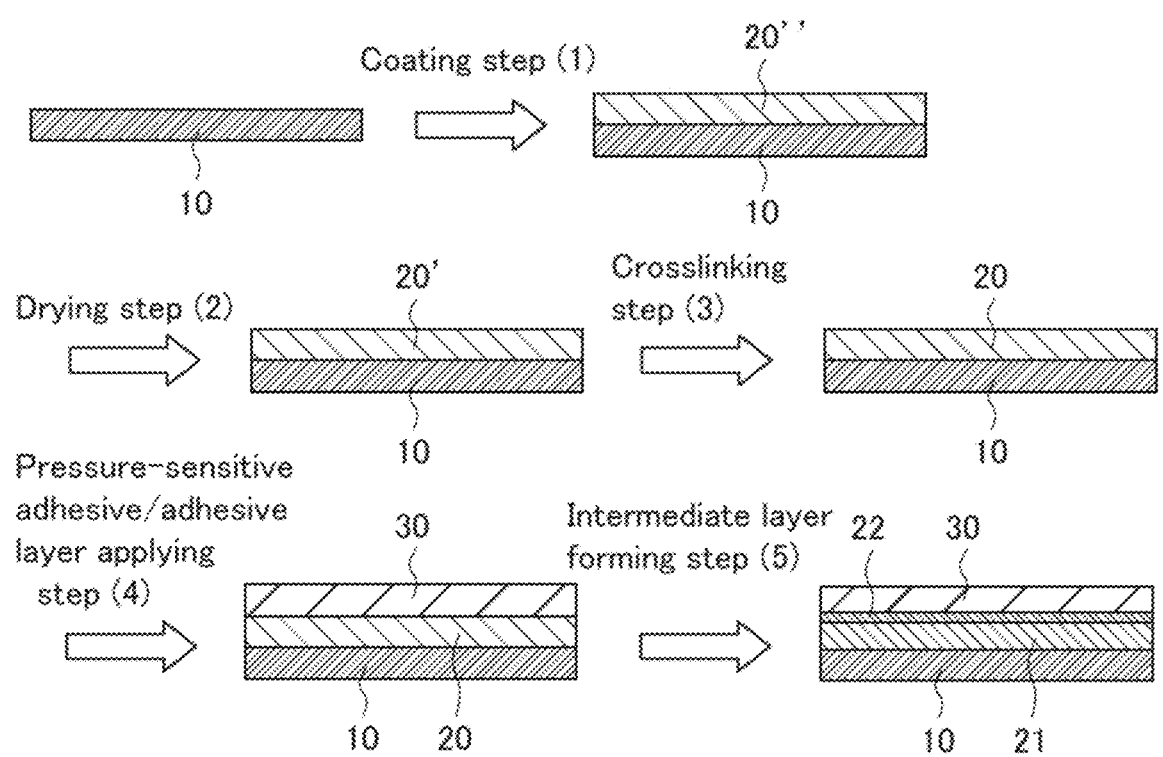
FIG. 7 is a sectional view schematically illustrating still another example of a process of the method for forming the functional porous body on the base in the present invention.
Figure 8:
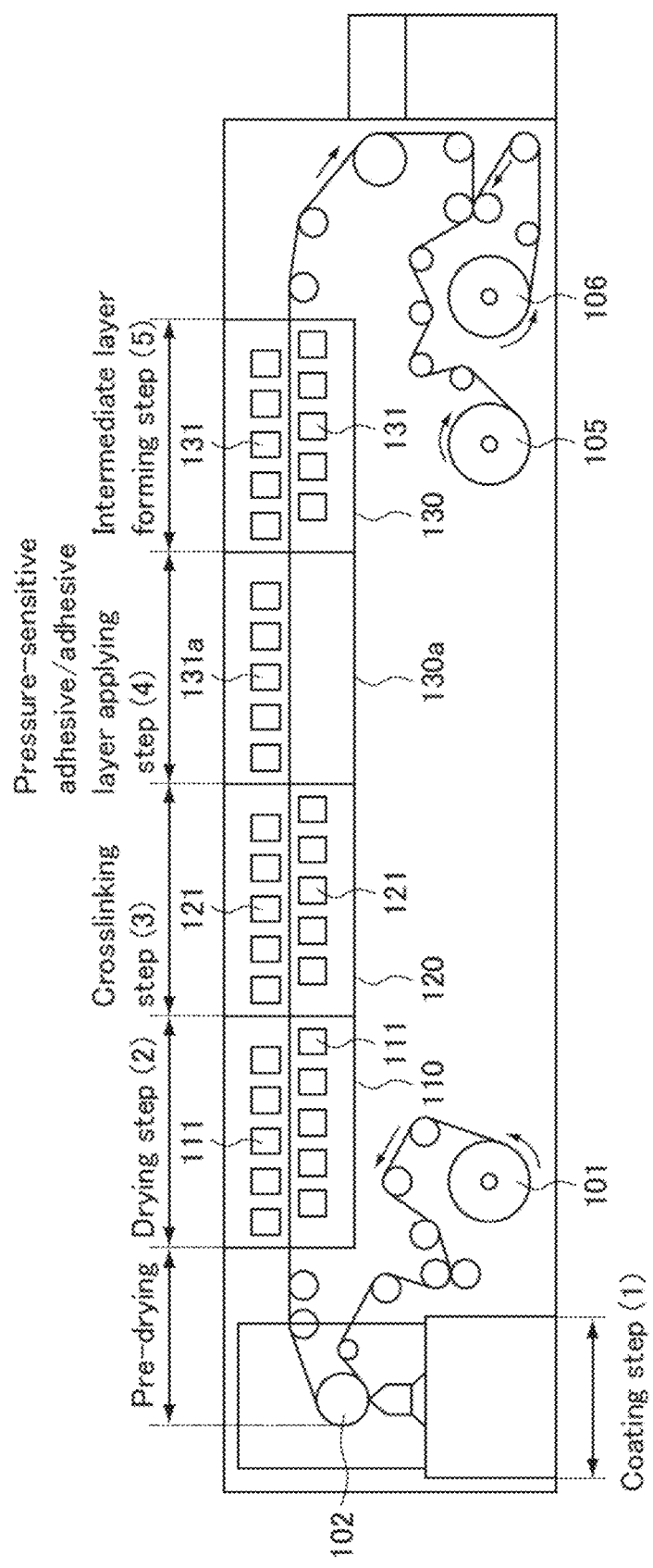
FIG. 8 is a schematic view showing still another example of some steps in a method for producing a functional porous body using the porous gel-containing liquid of the present invention and an apparatus used in the method.
Figure 9:
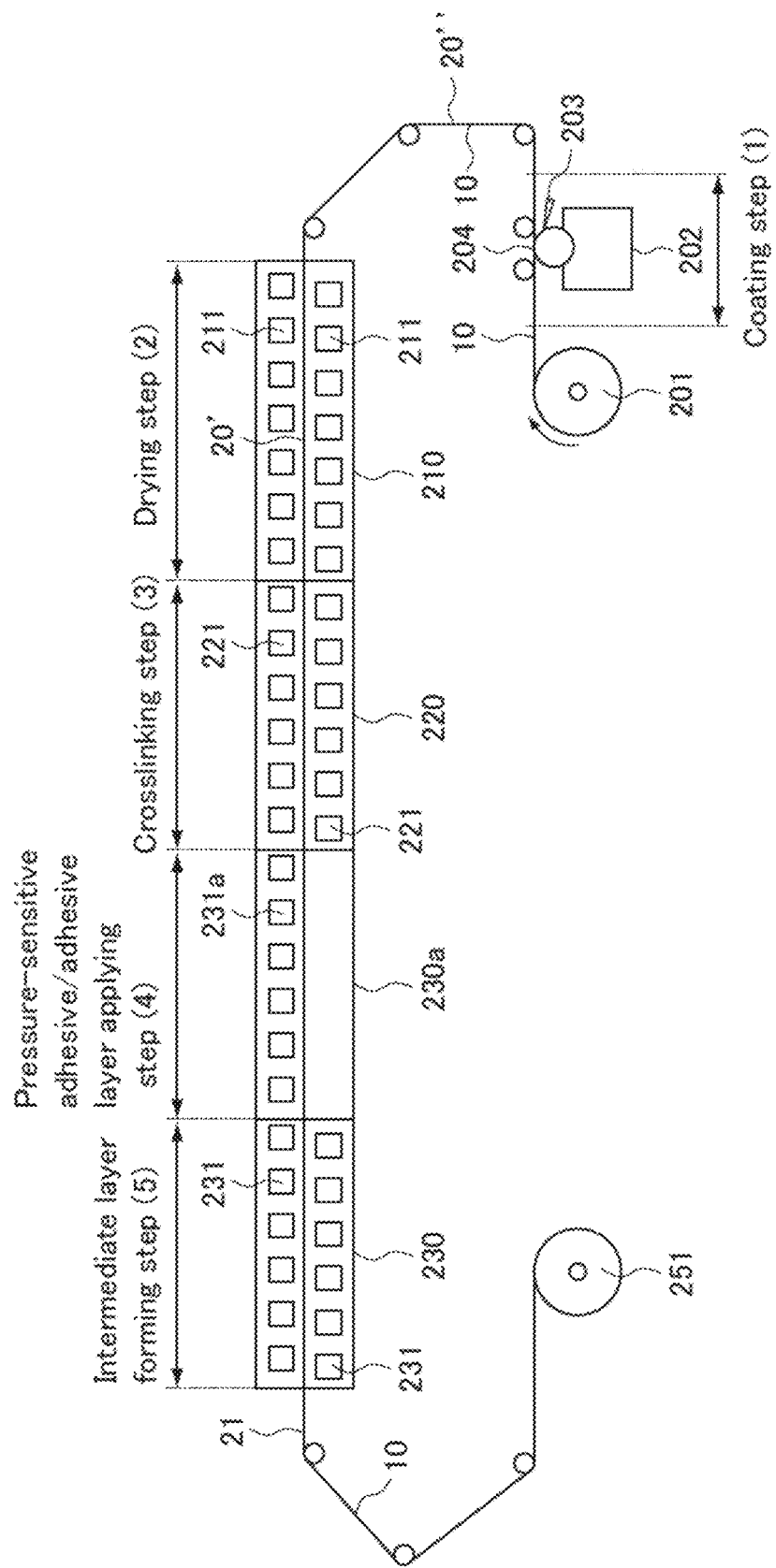
FIG. 9 is a schematic view showing still another example of some steps in a method for producing a functional porous body using the porous gel-containing liquid of the present invention and an apparatus used in the method.

FIGS. 7 to 9 show still other examples of continuous processing steps in the method for forming the silicone porous body of the present invention. As can be seen from the sectional view of FIG. 7, the method shown in FIG. 7 includes, after a chemical treatment step (e.g., crosslinking treatment step) (3) of forming a silicone porous body 20, a pressure-sensitive adhesive/adhesive layer coating step (pressure-sensitive adhesive/adhesive layer forming step) (4) of coating a pressure-sensitive adhesive/adhesive layer 30 onto the silicone porous body 20 and an intermediate layer forming step (5) of forming an intermediate layer 22 by causing the silicone porous body 20 to react with the pressure-sensitive adhesive/adhesive layer 30. Except for the above, the methods shown in FIGS. 7 to 9 are the same as the methods shown in FIGS. 4 to 6, respectively. In FIG. 7, the intermediate layer forming step (5) also serves as a step of improving the strength of the silicone porous body 20 (strength improving step). Thus, after the intermediate layer forming step (5), the silicone porous body 20 turns into a silicone porous body 21 with an improved strength. It is to be noted, however, that the present invention is not limited thereto, and it is not necessary that the silicone porous body 20 turns into the one with an improved strength after the intermediate layer forming step (5), for example. The pressure-sensitive adhesive/adhesive layer coating step (pressure-sensitive adhesive/adhesive layer forming step) (4) and the intermediate layer forming step (5) are not particularly limited, and are as described above, for example.

FIG. 8 is a schematic view showing still another example of a slot die coating apparatus and the method for forming a silicone porous body using the same. As can be seen from FIG. 8, the coating apparatus shown in FIG. 8 is the same as the apparatus shown in FIG. 5, except that it includes, right next to a chemical treatment zone 120 in which a chemical treatment step (3) is performed, a pressure-sensitive adhesive/adhesive layer coating zone 130a in which a pressure-sensitive adhesive/adhesive layer coating step (4) is performed. In FIG. 8, in an intermediate layer forming zone (aging zone) 130 provided right next to the pressure-sensitive adhesive/adhesive layer coating zone 130a, a heat treatment can be performed using hot air fans (heating units) 131 disposed above and below the base 10 in the same manner as the heat treatment performed in the strength improving zone (aging zone) 130 in FIG. 5. That is, in the apparatus shown in FIG. 8, after the chemical treatment step (3), the pressure-sensitive adhesive/adhesive layer coating step (pressure-sensitive adhesive/adhesive layer forming step) (4) of applying (coating) a pressure-sensitive adhesive or an adhesive to a silicone porous body 20 to form a pressure-sensitive adhesive/adhesive layer 30 is performed in the pressure-sensitive adhesive/adhesive layer coating zone 130a using pressure-sensitive adhesive/adhesive layer coating units 131a. As described above, instead of applying (coating) the pressure-sensitive adhesive or the adhesive, an adhesive tape including the pressure-sensitive adhesive/adhesive layer 30 may be adhered (attached) to the silicone porous body 20, for example. Further, an intermediate layer forming step (aging step) (5) is performed in the intermediate layer forming zone (aging zone) 130 to form an intermediate layer 22 by causing the silicone porous body 20 to react with the pressure-sensitive adhesive/adhesive layer 30. In this step, the silicone porous body 20 turns into a silicone porous body 21 with an improved strength, as described above. The heating temperature, heating time, etc. of the heating by the hot air fans (heating units) 131 are not particularly limited, and are as described above, for example.

FIG. 9 is a schematic view showing still another example of a coating apparatus for a micro-gravure method (micro-gravure coating method) and the method for forming a porous structure using the same. As can be seen from FIG. 9, the coating apparatus shown in FIG. 9 is the same as the apparatus shown in FIG. 6, except that it includes, right next to a chemical treatment zone 220 in which the chemical treatment step (3) is performed, a pressure-sensitive adhesive/adhesive layer coating zone 230a in which a pressure-sensitive adhesive/adhesive layer coating step (4) is performed. In FIG. 9, in an intermediate layer forming zone (aging zone) 230 provided right next to the pressure-sensitive adhesive/adhesive layer coating zone 230a, a heat treatment can be performed using hot air fans (heating units) 231 disposed above and below the base 10 in the same manner as the heat treatment performed in the strength improving zone (aging zone) 230 in FIG. 6. That is, in the apparatus shown in FIG. 9, after the chemical treatment step (3), the pressure-sensitive adhesive/adhesive layer coating step (pressure-sensitive adhesive/adhesive layer forming step) (4) of applying (coating) a pressure-sensitive adhesive or an adhesive to the silicone porous body 20 to form a pressure-sensitive adhesive/adhesive layer 30 is performed in the pressure-sensitive adhesive/adhesive layer coating zone 230a using pressure-sensitive adhesive/adhesive layer coating units 231a. As described above, instead of applying (coating) the pressure-sensitive adhesive or the adhesive, an adhesive tape including the pressure-sensitive adhesive/adhesive layer 30 may be adhered (attached) to the silicone porous body 20, for example. Further, an intermediate layer forming step (aging step) (5) is performed in the intermediate layer forming zone (aging zone) 230 to form an intermediate layer 22 by causing the silicone porous body 20 to react with the pressure-sensitive adhesive/adhesive layer 30. In this step, the silicone porous body 20 turns into a silicone porous body 21 with an improved strength, as described above. The heating temperature, heating time, etc. of the heating by the hot air fans (heating units) 231 are not particularly limited, and are as described above, for example.

[3. Functional porous body]

The functional porous body of the present invention is characterized in that, for example, an abrasion resistance of the functional porous body measured with BEMCOT® and indicating a film strength is from 60% to 100%, and a folding endurance of the functional porous body measured by an MIT test and indicating a flexibility is 100 times or more.

The functional porous body of the present invention is formed using pulverized products of a porous gel, for example. Thus, the three-dimensional structure of the porous gel is destroyed, and a new three-dimensional structure different from the three-dimensional structure of the porous gel is formed in the functional porous body. As described above, the functional porous body of the present invention is formed into a layer having a new pore structure (new void structure) that cannot be provided by a layer formed from the porous gel. This allows the formation of a nanoscale functional porous body having a high void fraction. Further, when the functional porous body of the present invention is a silicone porous body, for example, pulverized products are chemically bonded to each other while adjusting the number of functional groups with siloxane bonds in the silicon compound gel, for example. The pulverized products are chemically bonded (e.g., crosslinked) to each other in the bonding step after the new three-dimensional structure has been formed as a precursor of the functional porous body. Thus, for example, while the functional porous body of the present invention has a structure with void spaces, it can maintain a sufficient strength and sufficient flexibility. Therefore, according to the present invention, it is possible to provide a functional porous body in various objects easily in a simple manner. Specifically, the functional porous body of the present invention can be used as, for example, a heat insulating material, a sound absorbing material, a scaffold for regenerative medicine, a condensation prevention material, or an optical element, instead of an air layer.

As described above, the functional porous body of the present invention contains pulverized products of a porous gel, and the pulverized products are chemically bonded to each other, for example. In the functional porous body of the present invention, the form of the chemical bonding (chemical bonds) between the pulverized products is not particularly limited. Specifically, the chemical bonds may be crosslinking bonds, for example. The method for chemically bonding the pulverized products to each other will be described below in detail in connection with the method for producing the functional porous body.

The crosslinking bonds are siloxane bonds, for example. Examples of the siloxane bonds include T2, T3, and T4 bonds shown below. When the silicone porous body of the present invention includes siloxane bonds, the silicone porous body may include any one of the T2, T3, and T4 bonds, any two of them, or all three of them, for example. As the proportions of T2 and T3 become higher, the silicone porous body becomes more flexible, so that it is expected that the silicone porous body exhibits characteristics intrinsic to the gel. However, the film strength of the silicone porous body is deteriorated. When the proportion of T4 in the siloxane bonds becomes higher, a film strength is more likely to be obtained, whereas void spaces become smaller, resulting in deteriorated flexibility. Thus, it is preferable to adjust the proportions of T2, T3, and T4 depending on the intended use of the silicone porous body, for example.

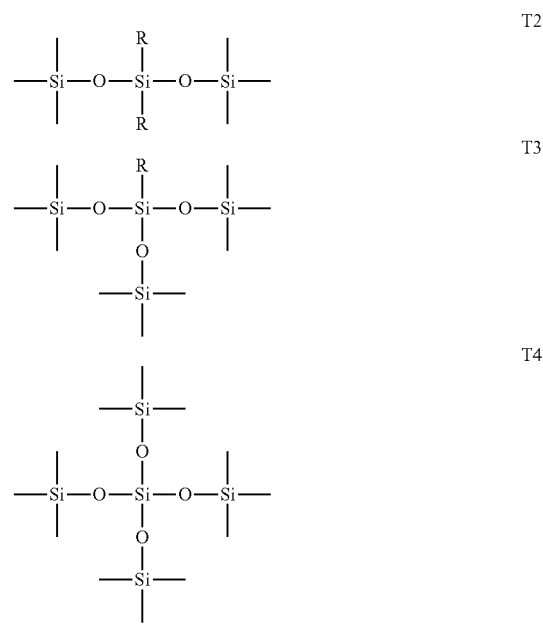

In the case where the functional porous body of the present invention includes the siloxane bonds, the ratio of T2, T3, and T4 expressed relatively assuming that the proportion of T2 is "1" is as follows, for example: T2:T3:T4=1:[1 to 100]:[0 to 50], 1:[1 to 80]:[1 to 40], or 1:[5 to 60]:[1 to 30].

It is preferable that silicon atoms contained in the functional porous body of the present invention are bonded with each other through siloxane bonds, for example. As a specific example, the proportion of unbonded silicon atoms (i.e., residual silanol) among all the silicon atoms contained in the silicone porous body is less than 50%, 30% or less, or 15% or less, for example.

The functional porous body of the present invention has a pore structure. The size of each void space in the pore structure indicates, out of the diameter of the long axis and the diameter of the short axis of the void space (pore), the diameter of the long axis. The size of the void space (pore) is from 5 nm to 200 nm, for example. The lower limit of the size is, for example, 5 nm or more, 10 nm or more, or 20 nm or more. The upper limit of the size is, for example, 1000 μm or less, 500 μm or less, or 100 μm or less. The range of the size is, for example, from 5 nm to 1000 μm, from 10 nm to 500 μm, or from 20 nm to 100 μm. A preferable size of the void spaces is determined depending on the use of the void structure. Thus, it is necessary to adjust the size of the void spaces to a desired value according to the intended use, for example. The size of the void spaces can be evaluated in the following manner, for example.

(Evaluation of Size of Void Spaces)

In the present invention, the size of the void spaces can be quantified according to the BET test. Specifically, 0.1 g of a sample (the functional porous body of the present invention) is set in a capillary tube of a surface area measurement apparatus (ASAP 2020, manufactured by Micromeritics), and dried under reduced pressure at room temperature for 24 hours to remove gas in the void structure. Then, an adsorption isotherm is created by causing the sample to adsorb nitrogen gas, whereby the pore distribution is determined. On the basis of the thus-determined pore distribution, the size of the void spaces can be evaluated.

In the functional porous body of the present invention, for example, an abrasion resistance of the functional porous body measured with BEMCOT® and indicating a film strength is from 60% to 100%. With the film strength in the above-described range, the functional porous body of the present invention is excellent in abrasion resistance during various processes, for example. The functional porous body of the present invention has a scratch resistance during production processes of winding up the functional porous body after being formed into a film and handling the film obtained as a product, for example. On the other hand, for example, the functional porous body of the present invention may be configured so as to increase the particle size of pulverized products of the silicon compound gel and the binding force at neck portions where the pulverized products are bonded to each other utilizing a catalytic reaction in a heating step to be described below, instead of lowering the void fraction. As a result, while a void structure is brittle by its nature, the functional porous body of the present invention can impart a strength at a certain level to the void structure, for example.

The lower limit of the abrasion resistance is 60% or more, 80% or more, 90% or more, for example. The upper limit of the abrasion resistance is 100% or less, 99% or less, 98% or less, for example. The range of the abrasion resistance is from 60% to 100%, from 80% to 99%, or from 90% to 98%, for example.

The abrasion resistance can be measured in the following manner, for example.

(Evaluation of Abrasion Resistance)

(1) From a void layer (the functional porous body of the present invention) formed on an acrylic film by coating, a circular cut piece with a diameter of about 15 mm is cut out as a sample.

(2) Next, regarding the sample, the coating amount of Si ($Si_0$) is measured by identifying silicon using an X-ray fluorescence spectrometer (ZSX Primus II, manufactured by Shimadzu Corporation). Next, a cut piece with a size of 50 mm×100 mm is cut out from the void layer on the acrylic film. This cut piece is cut out from a vicinity of the site where the circular cut piece was obtained. The obtained cut piece is fixed onto a glass plate (thickness: 3 mm), and the BEMCOT® sliding test is performed. The sliding conditions are as follows: weight: 100 g, reciprocation: 10 times.

(3) Regarding the void layer after being subjected to the sliding, the sampling and the X-ray fluorescence measurement are performed in the same manner as in the above item (1) to measure the residual amount of Si ($Si_1$) after the abrasion test. The abrasion resistance is defined as the residual ratio of Si (%) before and after the BEMCOT® sliding test, and is represented by the following formula.

Abrasion resistance (%)=[the residual amount of Si ($Si_1$)/the coating amount of Si ($Si_0$)]×100(%)

The folding endurance of the silicone porous body of the present invention measured by the MIT test and indicating the flexibility is 100 times or more, for example. With the flexibility in the above-described range, for example, the silicone porous body of the present invention exhibits superior handleability during a winding operation in a production process and in use, for example.

The lower limit of the folding endurance is, for example, 100 times or more, 500 times or more, or 1000 times or more. The upper limit of the folding endurance is not particularly limited, and is, for example, 10000 times or less. The range of the folding endurance is, for example, from 100 to 10000 times, from 500 to 10000 times, or from 1000 to 10000 times.

The term "flexibility" means the deformability of a substance, for example. The folding endurance can be measured by the MIT test in the following manner, for example.

(Evaluation by Folding Endurance Test)

The void layer (the functional porous body of the present invention) is cut into a strip-shaped piece with a size of 20 mm×80 mm. The thus-obtained cut piece is set in an MIT folding endurance tester (BE-202, manufactured by TESTER SANGYO CO., LTD.), and 1.0 N load is applied thereto. As a chuck portion for holding the void layer, R 2.0 mm is used, and the load is applied 10000 times at most. The number of times of the load application at which the void layer is fractured is determined as the folding endurance.

In the functional porous body of the present invention, the film density indicating the void fraction is not particularly limited. The lower limit thereof is 1 $g/cm^3$ or more, 5 $g/cm^3$ or more, 10 $g/cm^3$ or more, or 15 $g/cm^3$ or more, for example. The upper limit thereof is 50 $g/cm^3$ or less, 40 $g/cm^3$ or less, 30 $g/cm^3$ or less, or 2.1 $g/cm^3$ or less, for example. The range thereof is from 5 to 50 $g/cm^3$, from 10 to 40 $g/cm^3$, from 15 to 30 $g/cm^3$, or from 1 to 2.1 $g/cm^3$, for example.

The film density can be measured in the following manner, for example.

(Evaluation of Film Density)

A void layer (the functional porous body of the present invention) is formed on an acrylic film. Thereafter, the X-ray reflectance in a total reflection region is measured using an X-ray diffractometer (RINT-2000, manufactured by RIGAKU). Then, after fitting with Intensity at 2θ, the porosity (P %) is calculated from the critical angle of total reflection of the laminate of the void layer and the base. The film density can be represented by the following formula.

Film density (%)=100(%)−porosity (P %)

It is only necessary that the functional porous body of the present invention has a pore structure (porous structure) as described above, and the pore structure (porous structure) may be, for example, an open-cell structure in which pores are interconnected with each other. The open-cell structure means that, in the functional porous body, pores communicate with each other three-dimensionally, for example. In other words, the open-cell structure means the state where void spaces inside the pore structure are interconnected with each other. When a porous body has an open-cell structure, this structure allows the bulk body to have a higher void fraction. However, in the case where closed-cell particles such as hollow silica particles are used, an open-cell structure cannot be formed. In contrast, in the functional porous body of the present invention, an open-cell structure can be formed easily for the following reason. Sol particles (pulverized products of a porous gel for forming a sol) used in the present invention each have a dendritic structure, so that the open-cell structure is formed as a result of sedimentation and deposition of the dendritic particles in a coating film (a coating film formed of a sol containing pulverized products of the porous gel). Further, it is more preferable that the functional porous body of the present invention forms a monolith structure, which is an open-cell structure including two or more types of micropore distributions. The monolith structure refers to a layered structure including a structure in which nano-sized void spaces are present and an open-cell structure formed by aggregation of the nano-sized spaces, for example. When the monolith structure is formed, for example, the film strength is imparted by the minute void spaces whereas a high void fraction is achieved by the presence of the void spaces forming a bulky open-cell structure. Thus, both a film strength and a high void fraction can be attained. In order to form such a monolith structure, for example, first, in the porous gel before being pulverized into the pulverized products, it is important to control the micropore distributions in a void structure to be generated. Also, the monolith structure can be formed by, for example, controlling, at the time of pulverizing the porous gel, the particle sizes of pulverized products so that a desired particle size distribution can be obtained after the pulverization.

In the functional porous body of the present invention, the percentage of elongation at the time of crack generation by tearing, which indicates the flexibility of the functional porous body, is not particularly limited. The lower limit thereof is 0.1% or more, 0.5% or more, or 1% or more, for example. The upper limit thereof is 3% or less, for example. The range of the percentage of elongation at the time of crack generation by tearing is from 0.1% to 3%, from 0.5% to 3%, or from 1% to 3%, for example.

The percentage of elongation at the time of crack generation by tearing can be measured in the following manner, for example.

(Evaluation of Percentage of Elongation at the Time of Crack Generation by Tearing)

A void layer (the functional porous body of the present invention) is formed on an acrylic film. Then, from the thus-obtained laminate, a strip-shaped cut piece with a size of 50 mm×140 mm is obtained as a sample. Then, the sample is chucked in a tensile testing machine (AG-Xplus, manufactured by Shimadzu Corporation) with a distance between chucks being 100 mm, and the tensile test is performed at a tensile speed of 0.1 mm/s. The sample being tested is observed carefully, and the test is terminated when a crack(s) is formed in any part of the sample. The percentage (%) of elongation at the time when the crack(s) is formed is regarded as the percentage of elongation at the time of crack generation by tearing.

In the functional porous body of the present invention, the haze value indicating the transparency is not particularly limited. The lower limit thereof is 0.1% or more, 0.2% or more, or 0.3% or more, for example. The upper limit thereof is 10% or less, 5% or less, or 3% or less, for example. The range thereof is from 0.1% to 10%, from 0.2% to 5%, or 0.3% to 3%, for example.

The haze value can be measured in the following manner, for example.

(Evaluation of Haze Value)

A void layer (the functional porous body of the present invention) is cut into a piece with a size of 50 mm×50 mm, and the thus-obtained cut piece is set in a haze meter (HM-150, manufactured by product of Murakami Color Research Laboratory) to measure the haze value. The haze value is calculated by the following formula.

Haze value (%)=[diffuse transmittance (%)/total light transmittance (%)]×100(%)

The "refractive index" of a given medium generally refers to the ratio of transmission speed of the wavefront of light in vacuum to the phase velocity of light in the medium. The refractive index of the silicone porous body of the present invention is not particularly limited. The upper limit thereof is 1.3 or less, less than 1.3, 1.25 or less, 1.2 or less, or 1.15 or less, for example. The lower limit thereof is 1.05 or more, 1.06 or more, or 1.07 or more, for example. The range thereof is, for example, not less than 1.05 and not more than 1.3, not less than 1.05 and less than 1.3, not less than 1.05 and not more than 1.25, not less than 1.06 and less than 1.2, or not less than 1.07 and not more than 1.15.

In the present invention, the refractive index refers to the one measured at a wavelength of 550 nm, unless otherwise stated. The method for measuring the refractive index is not particularly limited. For example, the refractive index can be measured in the following manner.

(Evaluation of Refractive Index)

A void layer (the functional porous body of the present invention) is formed on an acrylic film, and the obtained laminate is then cut into a piece with a size of 50 mm×50 mm. The thus-obtained cut piece is adhered onto a surface of a glass plate (thickness: 3 mm) with a pressure-sensitive adhesive layer. The central portion (diameter: about 20 mm) of the back surface of the glass plate is painted entirely with a black magic marker, thereby preparing a sample that allows no reflection at the back surface of the glass plate. The sample is set in an ellipsometer (VASE, manufactured by J. A. Woollam Japan), and the refractive index is measured at a wavelength of 500 nm and at an incidence angle of 50° to 80°. The mean value of the thus-obtained measured values is set as the refractive index.

The thickness of the functional porous body of the present invention is not particularly limited. The lower limit thereof is 0.05 μm or more or 0.1 μm or more, for example. The upper limit thereof is 1000 μm or less or 100 μm or less, for example. The range thereof is from 0.05 to 1000 μm or from 0.1 to 100 μm, for example.

The form of the functional porous body of the present invention is not particularly limited. For example, the functional porous body of the present invention may be in the form of a film, a block, or the like.

The method for producing the functional porous body of the present invention is not particularly limited. For example, the functional porous body can be produced by the above-described production method of the functional porous body.

[4. Use of Functional Porous Body]

The functional porous body produced using the porous gel-containing liquid of the present invention exhibits a function similar to that of an air layer, as described above.

Therefore, the functional porous body can be used in an object having an air layer as an alternative to the air layer.

A member including the functional porous body is, for example, a heat insulating material, a sound absorbing material, a condensation prevention material, an optical element, etc. Such a member can be used by disposing it to a site where an air layer is necessary, for example. The form of the member is not particularly limited, and may be in the form of a film, for example.

Another example of the member including the functional porous body is a scaffold for regenerative medicine. As described above, the functional porous body has a porous structure that exhibits a function similar to that of an air layer. Void spaces in the functional porous body are suitable for holding cells, sources of nutrition, air, and the like, for example. Thus, the porous structure is useful as a scaffold for regenerative medicine, for example.

In addition to the above-described members, examples of the member including the functional porous body further include a total reflection member, an ink image receiving member, a single-layer AR (antireflection) member, a member having a single-layer moth-eye structure, and a dielectric constant material.

EXAMPLES

Examples of the present invention will be described below. It is to be noted, however, that the present invention is by no means limited to the following examples.

Example 1

In the present example, a porous gel-containing liquid of the present invention was produced in the following manner, and using the porous gel-containing liquid, a porous structure (silicone porous body) was further produced.

(1) Gelation of Silicon Compound 9.5 kg of a silicon compound precursor MTMS was dissolved in 22 kg of DMSO. To the resultant mixture, 5 kg of 0.01 mol/l oxalic acid aqueous solution was added. The resultant mixture was stirred at room temperature for 120 minutes, whereby MTMS was hydrolyzed to generate tris (hydroxy)methylsilane.

3.8 kg of ammonia water with an ammonia concentration of 28% and 2 kg of pure water were added to 55 kg of DMSO. Thereafter, the above-described mixture after being subjected to the hydrolysis treatment was further added thereto. The resultant mixture was stirred at room temperature for 15 minutes to cause gelation of tris(hydroxy) methylsilane. Thus, a gelled silicon compound was obtained.

(2) Aging Treatment

The mixture after being subjected to the above gelation treatment was subjected to an aging treatment as it was. The aging treatment was performed by incubating the mixture at 40° C. for 20 hours.

(3) Pulverization Treatment

Subsequently, the gelled silicon compound after being subjected to the aging treatment was granulated into pieces with a size from several millimeters to several centimeters using a spatula. 400 kg of IPA was added thereto continuously, and the solvent and the catalyst in the gel were removed by decantation. This decantation treatment was repeated to a total of three times to complete solvent replacement. Then, the gelled silicon compound in the mixture was subjected to two-stage pulverization including a first pulverization step of performing continuous emulsifying dispersion (MILDER MDN 304, manufactured by Pacific Machinery & Engineering Co., Ltd.) and a second pulverization step of performing high pressure media-less pulverization (Star Burst HJP-25005, manufactured by Sugino Machine Limited). This pulverization treatment was carried out by adding 26.6 kg of IPA to 43.4 kg of a gel containing the gelled silicon compound after being subjected to the solvent replacement, weighting the mixture, and then subjecting the mixture to closed-circuit pulverization for 20 minutes in the first pulverization step and to pulverization under a pulverization pressure of 100 MPa in the second pulverization step. The average particle size of the pulverized products (sol particles) of the gel was measured by a dynamic light scattering Nanotrac particle size analyzer (type: UPA-EX150, manufactured by NIKKISO CO., LTD.). As a result, it was found that the average particle size was from 3 to 5 µm after the first pulverization step and from 250 to 350 nm after the second pulverization step. The shear viscosity of the liquid mixture was measured with a vibration-type viscometer (FEM-1000V, manufactured by SEKONIC CORPORATION). As a result, it was found that the shear viscosity immediately after the first pulverization step was from 200 to 300 mPa·s, and the shear viscosity immediately after the second pulverization stage was from 5 m to 10 mPa·s.

(4) Formation of Coating Film and Silicone Porous Body

Then, the coating solution was applied to a surface of a base made of polyethylene terephthalate (PET) by bar coating to form a coating film. The amount of the sol solution applied onto the base was 6 µl per 1 $mm^2$ of the surface of the base. The coating film was treated at 100° C. for 1 minute, whereby a silicone porous body was formed into a film. Thus, the silicone porous body having a thickness of 1 µm was obtained. The refractive index of this silicone porous body was measured. As a result, it was found that the silicone porous body was a highly uniform film exhibiting a low refractive index from 1.10 to 1.11.

This application claims priority from Japanese Patent Application No. 2015-192323 filed on Sep. 29, 2015. The entire disclosure of this Japanese patent application is incorporated herein by reference.

INDUSTRIAL APPLICABILITY

As specifically described above, the present invention can provide a method for producing, at an industrial level, a porous gel-containing liquid that is inexpensive and excellent in homogeneity, with which a high-void structure can be formed, a porous gel-containing liquid, a method for producing a high-void layer, and a method for producing a high-void porous body. A porous gel-containing liquid obtained by the production method of the present invention contains pulverized products of a porous gel. When the pulverized products of the porous gel are pulverized products of a silicon compound gel, the pulverized products contain residual silanol groups, for example. Thus, for example, by forming a coating film using the porous gel-containing liquid and chemically bonding the pulverized products in the coating film to each other, it is possible to produce a porous structure having void spaces. The porous structure formed using the porous gel-containing liquid can exhibits a function similar to that of an air layer, for example, as described above. Further, as described above, by chemically bonding the pulverized products to each other, the porous structure is immobilized, so that, for example, while the thus-obtained porous structure has void spaces, it can maintain a sufficient strength. Therefore, a functional porous body having the above-described porous structure can be provided in various objects easily in a simple manner. Specifically, the porous structure of the present invention can be used as, for example, a heat insulating material, a sound absorbing material, a scaffold for regenerative medicine, a condensation prevention material, or an optical element, instead of an air layer. Therefore, the production method of the present invention and a porous gel-containing liquid obtained by the production method are useful in production of the above-described porous structures, for example.

EXPLANATION OF REFERENCE NUMERALS

10: base
20: porous structure
20': coating film (precursor layer)
20": porous gel-containing liquid
21: porous structure with improved strength
101: feed roller
102: coating roller
110: oven zone
111: hot air fan (heating unit)
120: chemical treatment zone
121: lamp (light irradiation unit) or hot air fan (heating unit)
130a: pressure-sensitive adhesive/adhesive layer coating zone
130: strength improving zone, intermediate layer forming zone
131a: pressure-sensitive adhesive/adhesive layer applying unit
131: hot air fan (heating unit)
105: wind-up roller
106: roller
201: feed roller
202: liquid reservoir
203: doctor (doctor knife)
204: micro-gravure coater
210: oven zone
211: heating unit
220: chemical treatment zone
221: lamp (light irradiation unit) or hot air fan (heating unit)
230a: pressure-sensitive adhesive/adhesive layer coating zone
230: strength improving zone, intermediate layer forming zone
231a: pressure-sensitive adhesive/adhesive layer applying unit
231: hot air fan (heating unit)
251: wind-up roller

The invention claimed is:

1. A method for producing a porous gel-containing liquid, the method comprising:
   a gelation step of causing gelation of a porous body in a first solvent to obtain a gel of a porous body,
   a solvent replacement step of replacing the first solvent with a second solvent after the gelation step, the first solvent and the second solvent are different, and
   a pulverization step of pulverizing the gel of the porous body, the pulverization step is performed using the second solvent,
   wherein the pulverization step is carried out as multi-stage pulverization comprising,
   at least a first pulverization stage and a second pulverization stage,
   the first pulverization stage is a pulverization stage in which the gel of the porous body is pulverized into sol particles having a mean average particle size from 1 to 100 μm, and
   the second pulverization stage is a pulverization stage in which, after the first pulverization stage, the sol particles of the porous body are further pulverized into particles having a mean average particle size from 10 to 1000 nm.

2. The method according to claim 1, wherein
   a pulverization process used in the first pulverization stage is different from a pulverization process used in the second pulverization stage.

3. The method according to claim 1, wherein
   the porous gel-containing liquid is a sol solution containing particles obtained by pulverizing the gel of the porous body.

4. The method according to claim 1, wherein
   the first pulverization stage and the second pulverization stage are each performed in a liquid.

5. The method according to claim 1, wherein,
   the first pulverization stage and the second pulverization stage are each performed in a liquid,
   the liquid immediately after the first pulverization stage has a shear viscosity in a range from 1 to 100 Pa·s, and
   the liquid immediately after the second pulverization stage has a shear viscosity in a range from 1 mPa·s to 1 Pa·s.

6. The method according to claim 1, further comprising, after at least one of the first pulverization stage and the second pulverization stage, a classification step of classifying the particles of the gel of the porous body.

7. The method according to claim 1,
   wherein the gelled porous body obtained in the gelation step is pulverized in the pulverization step.

8. The method according to claim 7, further comprising an aging step of aging the gelled porous body in the solvent,
   wherein the porous body after being subjected to the aging step is pulverized in the pulverization step.

9. The method according to claim 7,
   wherein the porous body in the second solvent is pulverized in the pulverization step.

10. The method according to claim 1, wherein
    in at least one of the first pulverization stage and the second pulverization stage, pulverization of the porous body is controlled while measuring a shear viscosity of the liquid.

11. The method according to claim 1, wherein the porous body is formed from a silicon compound, the silicon compound having two or more and four or less functional groups having saturated bonds, the functional groups can be the same or different.

12. A method for producing a void layer, the method comprising the steps of:
    producing a porous gel-containing liquid by the method according to claim 1;
    forming a coating film by coating the porous gel-containing liquid onto a base; and
    drying the coating film.

13. A method for producing a void porous body, the method comprising the steps of:
    producing a porous gel-containing liquid by the method according to claim 1; and
    drying the porous gel-containing liquid.

14. A method for producing a laminated film roll comprising a resin film and a void porous layer and formed on the resin film, the method comprising the steps of:

producing a porous gel-containing liquid by the method according to claim 1;
feeding a resin film unwound from a roll of the resin film;
coating the porous gel-containing liquid onto the fed resin film to form a coating film on the resin film;
drying the coating film; and
winding up a laminated film comprising the resin film and the high-void layer formed on the resin film after the drying step.

15. The method according to claim 11, wherein the silicon compound is represented by the general formula (1)

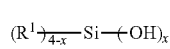

(1)

wherein X is 2, 3, or 4, and $R^1$ is a linear or a branched alkyl group.

16. The method according to claim 15, wherein the linear alkyl group is selected from the group consisting of a methyl group, an ethyl group, a propyl group, a butyl group, a pentyl group, and a hexyl group, and
the branched alkyl group is selected from the group consisting of an isopropyl group and an isobutyl group.

17. The method according to claim 15, wherein the silicon compound is represented by general formula (1')

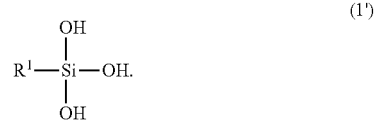

18. The method according to claim 12, wherein the gel of the porous body is a gelled silicon compound, and further includes the step of chemically bonding the pulverized product of the gelled silicon compound obtained in the pulverization step.

19. The method according to claim 13, wherein the gel of the porous body is a gelled silicon compound, and further includes the step of chemically bonding the pulverized product of the gelled silicon compound obtained in the pulverization step.

20. The method according to claim 14, wherein the gel of the porous body is a gelled silicon compound, and further includes the step of chemically bonding the pulverized product of the gelled silicon compound obtained in the pulverization step.

* * * * *